(12) United States Patent
Lee et al.

(10) Patent No.: US 8,081,005 B2
(45) Date of Patent: Dec. 20, 2011

(54) CAPACITIVE SENSORS FOR NANO-POSITIONING AND METHODS OF USING THE SAME

(75) Inventors: Scheng Chiang Lee, Macon, GA (US); Randall Douglas Peters, Macon, GA (US)

(73) Assignee: The Corporation of Mercer University, Macon, GA (US)

( * ) Notice: Subject to any disclaimer, the term of this patent is extended or adjusted under 35 U.S.C. 154(b) by 329 days.

(21) Appl. No.: 12/405,872

(22) Filed: Mar. 17, 2009

(65) Prior Publication Data

US 2010/0237880 A1 Sep. 23, 2010

(51) Int. Cl.
*G01R 27/26* (2006.01)
(52) U.S. Cl. ......... 324/662; 324/661; 324/679; 324/686
(58) Field of Classification Search .................. 324/662, 324/660–661, 679, 686
See application file for complete search history.

(56) References Cited

U.S. PATENT DOCUMENTS

| | | | |
|---|---|---|---|
| 5,028,875 A | 7/1991 | Peters | |
| 5,461,319 A | 10/1995 | Peters | |
| 5,861,754 A * | 1/1999 | Ueno et al. .................... | 324/660 |

OTHER PUBLICATIONS

Kim et al., A New Linear Encoder-like Capacitive Displacement Sensor, Measurement vol. 39, pp. 481-489, 2006.
Baxter, "Capacitive Sensors", pp. 1-17, Jul. 2000.
Johnson, "Displacement, Location or Position Sensors, National Instruments", Process of Control Instrumentation Technology, copyright 1997.
Kolb et al., "Capacitive Sensor for Micropositioning in Two Dimension", Rev. Sc. Instrum., vol. 69, pp. 310-312, Jan. 1998.
Peters et al., "An Inexpensive Synchronous Detector and its Application to Differential Capacitance Sensors", Rev. Sci. Instrum., vol. 63, No. 8, pp. 3989-3992, Aug. 1992.
Peters, "Full-Bridge Capacitive Extensometer", Rev. Sci. Instrum, vol. 64, No. 8, pp. 2250-2255, Aug. 1993.
Peters, "Capacitive Angle Sensor with Infinite Range", Rev. Sci. Instrum, vol. 64, No. 3, pp. 810-813, Mar. 1993.
Peters et al., "Capacitive Servo-Device for Microrobotic Applications", J. Micromech. Microeng. vol. 1, pp. 103-112, 1991.
Peters, Symmetric Differential Capacitive Pressure Sensor, Rev. Sci., Instrum, vol. 64, No. 8, pp. 2256-2261, Aug. 1993.
Capacitive Nanometrology Position Sensors Overview Product Sheet, Physik Instruments.
Veauvy, et al., "Scanning u-superconduction Quantum Interference Device Force Microscope", Rev. Sci., Instrum., vol. 73, No. 11, pp. 3825-3830, Nov. 2002.0.
Lee et al., "Nanoposition Sensors with Superior Linear Response to Position and Unlimited Travel Ranges", Rev. Sci., Instrum., vol. 80, pp. 045109-1-045109-6, 2009.
Chen, et al., "An Intrinsic Optical-Fiber Position Sensor with Schemes for Temperature Compensation and Resolution Enhancement", Jrl. Lightwave Tech., vol. 15, No. 2,pp. 261-266, Feb. 1997.
Nyce, "Capacitive Sensing", Linear Positions Sensors: Theory and Applications, pp. 62-77, 2004.

* cited by examiner

*Primary Examiner* — Huy Q Phan
*Assistant Examiner* — Alesa Allgood
(74) *Attorney, Agent, or Firm* — Withers & Keys, LLC

(57) ABSTRACT

Symmetrical differential capacitive sensors are disclosed. Methods of making and using symmetrical differential capacitive sensors are also disclosed.

18 Claims, 11 Drawing Sheets

CAPACITIVE SENSORS FOR NANO-POSITIONING AND METHODS OF USING THE SAME

TECHNICAL FIELD

The present invention relates to symmetrical differential capacitive sensors, and methods of making and using symmetrical differential capacitive sensors.

BACKGROUND

Nano-positioning is one of the foundations on which the modern nanotechnology is developed. High quality nano-positioning stages usually employ a close-loop feedback circuit in control electronics to ensure a desired position on a sub-nanometer (nm) scale. This requires position sensors, which directly measure the position of the stage. Several sensors are now commonly available for this purpose. For example, optical interferometers have been the standard for calibrating linear displacements, and are used in some translation stages as the position sensors. However, the relatively complex structure of this type of sensor makes it less desired in compact designs. Another mainstream nano-position sensors using direct metrology are gap-varying capacitive sensors with 0.01 nm resolution such as Physik Instrumente's gap-varying capacitive sensor (e.g., PI's D-015, D-050, and D-100 sensors). The resolution of this kind of capacitive sensor can out-perform high quality optical interferometers, and is believed to be the most sensitive position sensor in the marketplace. However, the physical design of this type of sensor is bulky due to the fact that the coupling area must be huge compared to the gap. Therefore, the dynamic range of this type of sensor is usually limited to at most a few hundred micrometers (μm).

Another disadvantage of gap-varying capacitive sensors (and perhaps of many other position sensors) is that the sensor response is not truly linear to the measured displacements. For example, Physik Instrumente's gap-varying capacitive sensors are gap-varying two-electrode capacitors. Consider the idealized approximation for the capacitance of parallel-plate capacitors, which is proportional to A/d, where A is the coupling area and d is the gap between the electrodes. Consequently, its capacitive response to the displacement, which causes "d" to vary, is nonlinear. The reason that Physik Instrumente's gap-varying capacitive sensors are able to claim linear responses is through a digital linearization algorithm, which means that the sensors are calibrated with polynomial approximations, and use the polynomial functions to digitally linearize the nonlinear capacitive responses.

In addition to the nonlinear capacitive response, since the sensors respond to the variation of the gap, the dynamic range is limited by the area. For longer travel distances, the area must be larger so that the polynomial approximations can be valid, and the area can not keep growing.

Efforts continue to develop nano-positioning sensors that do not have the problems associated with known nano-positioning sensors. In particular, efforts continue to develop nano-positioning sensors (i) having a sensor response that varies linearly to displacement of a sensor component, (ii) that can be made much smaller compared to known gap-varying capacitive sensors, and (iii) that can detect sub-nanometer displacements while having a potentially unlimited travel ranges for various applications.

SUMMARY

The present invention continues the effort to develop nano-positioning sensors by the discovery of symmetrical differential capacitive sensors that (i) have a sensor response that varies linearly to displacement of a mobile sensor component, (ii) can be made much smaller when compared to known gap-varying capacitive sensors, and (iii) can detect sub-nanometer displacements while having an essentially unlimited travel ranges for various applications.

In one exemplary embodiment, the symmetrical differential capacitive sensor of the present invention comprises (1) an array of two or more sets of stationary conductive surfaces extending in a first direction x with each set being separated from one another by a first distance s, each set of stationary conductive surfaces comprising four conductive surfaces a, b, c and d (i) separated from one another in the first direction x by a second distance p and separated from one another in a second direction y by a third distance m, the second direction y being perpendicular to the first direction x, and (ii) electrically coupled to one another to form two equipotential bridged pairs of stationary conductive surfaces a-d and b-c per set; (2) a voltage source operatively adapted to provide modulating voltage to the array; (3) electrical connectors (i) extending from the two or more sets of equipotential bridged pairs of stationary conductive surfaces a-d to the voltage source, and (ii) extending from the two or more sets of equipotential bridged pairs of stationary conductive surfaces b-c to the voltage source; (4) a first mobile sensor component comprising at least one set of first mobile sensing components, wherein each set of first mobile sensing components comprises at least one pair of side-by-side first mobile conductive surfaces A-B (e.g., a single pair of side-by-side first mobile conductive surfaces $A_1$-$B_1$, two pairs of side-by-side first mobile conductive surfaces $A_1$-$B_1$ and $A_2$-$B_2$, or more than two pairs of side-by-side first mobile conductive surfaces $A_1$-$B_1$ to $A_n$-$B_n$ where n is an integer greater than or equal to one) (i) positioned a gap distance d from the array and (ii) movable relative to the array in the first direction x, wherein each first mobile conductive surface A and B of a given pair of conductive surfaces A-B is separated from one another by the third distance m; (5) a first differential amplifier for each set of first mobile sensing components, wherein each first differential amplifier has two first inputs and a first output for measuring a potential difference between the two first inputs; (6) a pair of electrical connectors for each set of first mobile sensing components, each pair comprising (i) an electrical connector extending from first mobile conductive surface(s) A to one of the two first inputs of an associated first differential amplifier, and (ii) an electrical connector extending from first mobile conductive surface(s) B to another of the two first inputs of the associated first differential amplifier; and (7) a first synchronous detector for each first differential amplifier, wherein each first synchronous detector is coupled to the first output of an associated first differential amplifier; wherein each of the stationary conductive surfaces a, b, c and d and the first mobile conductive surfaces A and B (e.g., each of first mobile conductive surfaces $A_1$-$B_1$ to $A_n$-$B_n$) has (a) a substantially similar conductive surface area, $A_{cs}$, and (b) a substantially similar conductive surface shape.

In another exemplary embodiment, the symmetrical differential capacitive sensor of the present invention comprises (1) an array of two or more sets of stationary conductive surfaces extending in a first direction x with each set being separated from one another by a first distance s, each set of stationary conductive surfaces comprising four conductive surfaces a, b, c and d (i) separated from one another in the first direction x by a second distance p and separated from one another in a second direction y by a third distance m, the second direction y being perpendicular to the first direction x, and (ii) electrically coupled to one another to form two equipotential bridged pairs of stationary conductive surfaces a-d and b-c per set; (2) a voltage source operatively adapted to provide modulating voltage to the array; (3) electrical connectors (i) extending from the two or more sets of equipotential bridged pairs of stationary conductive surfaces a-d to the voltage source, and (ii) extending from the two or more sets of equipotential bridged pairs of stationary conductive surfaces b-c to the voltage source; (4) a first mobile sensor component comprising two sets of first mobile sensing components (i) positioned a gap distance d from the array, and (ii) movable relative to the array in the first direction x, wherein one set of first mobile sensing components comprises at least one pair of side-by-side first mobile conductive surfaces $A_1$-$B_1$ (e.g., a single pair of side-by-side first mobile conductive surfaces $A_1$-$B_1$, two pairs of side-by-side first mobile conductive surfaces $A_1$-$B_1$ and $A_2$-$B_2$, or more than two pairs of side-by-side first mobile conductive surfaces $A_1$-$B_1$ to $A_n$-$B_n$) and another set of first mobile sensing components comprises at least one pair of side-by-side first mobile conductive surfaces $A'_1$-$B'_1$ (e.g., a single pair of side-by-side first mobile conductive surfaces $A'_1$-$B'_1$, two pairs of side-by-side first mobile conductive surfaces $A'_1$-$B'_1$ and $A'_2$-$B'_2$, or more than two pairs of side-by-side first mobile conductive surfaces $A'_1$-$B'_1$ to $A'_n$-$B'_n$), and wherein each first mobile conductive surface A and B of a given pair of conductive surfaces A-B or A'-B' is separated from one another by the third distance m, and first mobile conductive surfaces A-B are separated from first mobile conductive surfaces A'-B' by a fourth distance q equal to $(i+\frac{1}{2})(L+p)$, where i is an integer greater than or equal to zero, and L is a length as measured in the first direction x of each stationary conductive surface; (5) first differential amplifiers $FDA_1$ and $FDA_2$ for each of the two sets of first mobile sensing components, each first differential amplifier having two first inputs and a first output for measuring a potential difference between the two first inputs; (6) electrical connectors (i) extending from each of the first mobile conductive surfaces $A_n$ to one of the two first inputs of first differential amplifier $FDA_1$, (ii) extending from each of the first mobile conductive surfaces $B_n$ to another of the two first inputs of first differential amplifier $FDA_1$, (iii) extending from each of the first mobile conductive surfaces $A'_n$ to one of the two first inputs of first differential amplifier $FDA_2$, and (iv) extending from each of the first mobile conductive surfaces $B'_n$ to another of the two first inputs of first differential amplifier $FDA_2$; and (7) first synchronous detectors $FSD_1$ and $FSD_2$ coupled to the first output of first differential amplifiers $FDA_1$ and $FDA_2$ respectively; wherein each of the stationary conductive surfaces a, b, c and d and the first mobile conductive surfaces $A_n$, $A'_n$, $B_n$ and $B'_n$ has (a) a substantially similar conductive surface area, $A_{cs}$ and (b) a substantially similar conductive surface shape.

In yet another exemplary embodiment, the symmetrical differential capacitive sensor of the present invention comprises (1) an array in the form of a grid of sets of stationary conductive surfaces a-d extending in a first direction x and a second direction y, the second direction y being perpendicular to the first direction x, wherein sets of stationary conductive surfaces a-d extending in the first direction x are separated from one another by a first distance s and sets of stationary conductive surfaces a-d extending in the second direction y are separated from one another by a third distance m, each set of stationary conductive surfaces comprising four conductive surfaces a, b, c and d (i) separated from one another in the first direction x by a second distance p and separated from one another in a second direction y by the third distance m, and (ii) electrically coupled to one another to form two equipotential bridged pairs of stationary conductive surfaces a-d and b-c per set; (2) a voltage source operatively adapted to provide modulating voltage to the array; (3) electrical connectors (i) extending from the two or more sets of equipotential bridged pairs of stationary conductive surfaces a-d to the voltage source, and (ii) extending from the two or more sets of equipotential bridged pairs of stationary conductive surfaces b-c to the voltage source; (4) a first mobile sensor component comprising at least one set of first mobile sensing components, wherein each set of first mobile sensing components comprises at least one pair of side-by-side first mobile conductive surfaces A-B (e.g., a single pair of side-by-side first mobile conductive surfaces $A_1$-$B_1$, two pairs of side-by-side first mobile conductive surfaces $A_1$-$B_1$ and $A_2$-$B_2$, or more than two pairs of side-by-side first mobile conductive surfaces $A_1$-$B_1$ to $A_n$-$B_n$ where n is an integer greater than or equal to one) (i) positioned a gap distance d from the array and (ii) movable relative to the array in the first direction x, wherein each first mobile conductive surface A and B of a given pair of conductive surfaces A-B is separated from one another by the third distance m; (5) a first differential amplifier for each set of first mobile sensing components, wherein each first differential amplifier has two first inputs and a first output for measuring a potential difference between the two first inputs; (6) a pair of electrical connectors for each set of first mobile sensing components, each pair comprising (i) an electrical connector extending from first mobile conductive surface(s) A to one of the two first inputs of an associated first differential amplifier, and (ii) an electrical connector extending from first mobile conductive surface(s) B to another of the two first inputs of the associated first differential amplifier; and (7) a first synchronous detector for each first differential amplifier, wherein each first synchronous detector is coupled to the first output of an associated first differential amplifier; (8) a second mobile sensor component comprising at least one set of second mobile sensing components, wherein each set of second mobile sensing components comprises at least one pair of side-by-side second mobile conductive surfaces C-D (e.g., a single pair of side-by-side second mobile conductive surfaces $C_1$-$D_1$, two pairs of side-by-side second mobile conductive surfaces $C_1$-$D_1$ and $C_2$-$D_2$, or more than two pairs of side-by-side second mobile conductive surfaces $C_1$-$D_1$ to $C_n$-$D_n$ where n is an integer greater than or equal to one) (i) positioned the gap distance d from the array and (ii) movable relative to the array in the second direction y, wherein each second mobile conductive surface C and D of a given pair of conductive surfaces C-D is separated from one another by the second distance p; (9) a second differential amplifier for each set of second mobile sensing components, wherein each second differential amplifier has having two second inputs and a second output for measuring a potential difference between the two second inputs; (10) a pair of electrical connectors for each set of second mobile sensing components, each pair comprising (i) an electrical connector extending from second mobile conductive surface(s) C to one of the two second inputs of an associated second differential amplifier, and (ii) an electrical connector extending from second mobile conductive surface(s) D to another of the two second inputs of the associated second differential amplifier; and (11) a second synchronous detector for each second differential amplifier, wherein each second synchronous detector is coupled to the second output of an associated second differential amplifier; wherein each of the stationary conductive surfaces a, b, c and d, the first mobile conductive surfaces A and B (e.g., each of first mobile conductive surfaces $A_1$-$B_1$ to $A_n$-$B_n$), and the second mobile conductive surfaces C and D (e.g., each of second mobile conductive surfaces $C_1$-$D_1$ to $C_n$-$D_n$) has (a) a substantially similar conductive surface area, $A_{cs}$, and (b) a substantially similar conductive surface shape.

The present invention is also directed to methods of making symmetrical differential capacitive sensors. In one exemplary embodiment, the method of making a symmetrical differential capacitive sensor comprises (I) forming an array of two or more sets of stationary conductive surfaces extending in a first direction x along a planar surface with each set being separated from one another by a first distance s, each set of stationary conductive surfaces comprising four conductive surfaces a, b, c and d (i) separated from one another in the first direction x by a second distance p and separated from one another in a second direction y by a third distance m, the second direction y being perpendicular to the first direction x, (II) electrically coupling (i) conductive surfaces a and d to one another and (ii) conductive surfaces b and c to one another to form two equipotential bridged pairs of stationary conductive surfaces a-d and b-c per set; (III) providing a voltage source operatively adapted to provide modulating voltage; (IV) providing electrical connectors (i) extending from the two or more sets of equipotential bridged pairs of stationary conductive surfaces a-d to the voltage source, and (ii) extending from the two or more sets of equipotential bridged pairs of stationary conductive surfaces b-c to the voltage source; (V) forming a first mobile sensor component comprising at least one set of first mobile sensing components, wherein each set of first mobile sensing components comprises at least one pair of side-by-side first mobile conductive surfaces A-B, wherein each first mobile conductive surface A and B of a given pair of conductive surfaces A-B is separated from one another by the third distance m; (VI) (i) positioning the first mobile sensor component a gap distance d from the array so as to be movable relative to the array in the first direction x, (VII) providing a first differential amplifier for each set of first mobile sensing components, wherein each first differential amplifier has two first inputs and a first output for measuring a potential difference between the two first inputs, (VIII) providing a pair of electrical connectors for each set of first mobile sensing components, each pair comprising (i) an electrical connector extending from first mobile conductive surface(s) A to one of the two first inputs of an associated first differential amplifier, and (ii) an electrical connector extending from first mobile conductive surface(s) B to another of the two first inputs of the associated first differential amplifier; and (IX) coupling a first synchronous detector to each first differential amplifier, wherein each first synchronous detector is coupled to the first output of an associated first differential amplifier; wherein each of the stationary conductive surfaces a, b, c and d and the first mobile conductive surfaces A and B (e.g., each of first mobile conductive surfaces $A_1$-$B_1$ to $A_n$-$B_n$) has (a) a substantially similar conductive surface area, $A_{cs}$, and (b) a substantially similar conductive surface shape.

The present invention is further directed to methods of using symmetrical differential capacitive sensors. In one exemplary embodiment, the method of using a symmetrical differential capacitive sensor comprises (I) moving a first mobile sensor component of a symmetrical differential capacitive sensor from a first point along an array in a first direction x to a second point along the array, the symmetrical differential capacitive sensor comprising (1) the array, wherein the array comprises two or more sets of stationary conductive surfaces extending in the first direction x with each set being separated from one another by a first distance s, each set of stationary conductive surfaces comprising four conductive surfaces a, b, c and d (i) separated from one another in the first direction x by a second distance p and separated from one another in a second direction y by a third distance m, the second direction y being perpendicular to the first direction x, and (ii) electrically coupled to one another to form two equipotential bridged pairs of stationary conductive surfaces a-d and b-c per set; (2) a voltage source operatively adapted to provide modulating voltage to the array; (3) electrical connectors (i) extending from the two or more sets of equipotential bridged pairs of stationary conductive surfaces a-d to the voltage source, and (ii) extending from the two or more sets of equipotential bridged pairs of stationary conductive surfaces b-c to the voltage source; (4) the first mobile sensor component, wherein the first mobile sensor component comprises at least one set of first mobile sensing components, wherein each set of first mobile sensing components comprises at least one pair of side-by-side first mobile conductive surfaces A-B (i) positioned a gap distance d from the array and (ii) movable relative to the array in the first direction x, wherein each first mobile conductive surface A and B of a given pair of conductive surfaces A-B is separated from one another by the third distance m; (5) a first differential amplifier for each set of first mobile sensing components, wherein each first differential amplifier has two first inputs and a first output for measuring a potential difference between the two first inputs has two first inputs and a first output for measuring a potential difference between the two first inputs; (6) a pair of electrical connectors for each set of first mobile sensing components, each pair comprising (i) an electrical connector extending from first mobile conductive surface(s) A to one of the two first inputs of an associated first differential amplifier, and (ii) an electrical connector extending from first mobile conductive surface(s) B to another of the two first inputs of the associated first differential amplifier; and (7) a first synchronous detector for each first differential amplifier, wherein each first synchronous detector is coupled to the first output of an associated first differential amplifier; wherein each of the stationary conductive surfaces a, b, c and d and the first mobile conductive surfaces A and B (e.g., each of first mobile conductive surfaces $A_1$-$B_1$ to $A_n$-$B_n$) has (a) a substantially similar conductive surface area, $A_{cs}$, and (b) a substantially similar conductive surface shape; and (II) converting a first signal output from the first synchronous detector into a first calculated distance between the first point and the second point.

These and other features and advantages of the present invention will become apparent after a review of the following detailed description of the disclosed embodiments and the appended claims.

BRIEF DESCRIPTION OF THE DRAWINGS

The present invention is further described with reference to the appended figures, wherein.

DETAILED DESCRIPTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to capacitive position sensors, which directly measure one or two dimensional nano-scale displacements through the variation in coupled areas of a given capacitive position sensor. The disclosed capacitive position sensors advantageously have a superior linear response to displacement unlike previously existing products. Further, the disclosed capacitive position sensors advantageously have essentially unlimited travel range unlike previous nano-positioning sensors. Given the features of the capacitive position sensors of the present invention, the capacitive position sensors of the present invention may be used in various applications including, but not limited to, the field of scanning probe microscopy, the field of nano-scale research, and the field of nano-fabrication, where large sizes of materials are handled and nano-meter precision is required.

The capacitive position sensors of the present invention comprise multiple pairs of planar electrodes (also referred to herein as "stationary conductive surfaces" and "mobile conductive surfaces" and "mobile sensing components"), one for modulation (i.e., modulated electrodes or "modulated stationary conductive surfaces") and one for position sensing in one or more dimensions (i.e., sensing electrodes or "sensing mobile conductive surfaces" or "mobile sensing components"). The modulated electrodes are (1) in the form of an array of sets of paired stationary conductive surfaces positioned along the x direction for one-dimensional sensing, or (2) in the form of a grid of sets of paired stationary conductive surfaces positioned along the x direction and the y direction for two-dimensional sensing. The size of a given array determines the dynamic range of a given sensor.

Figure 1:
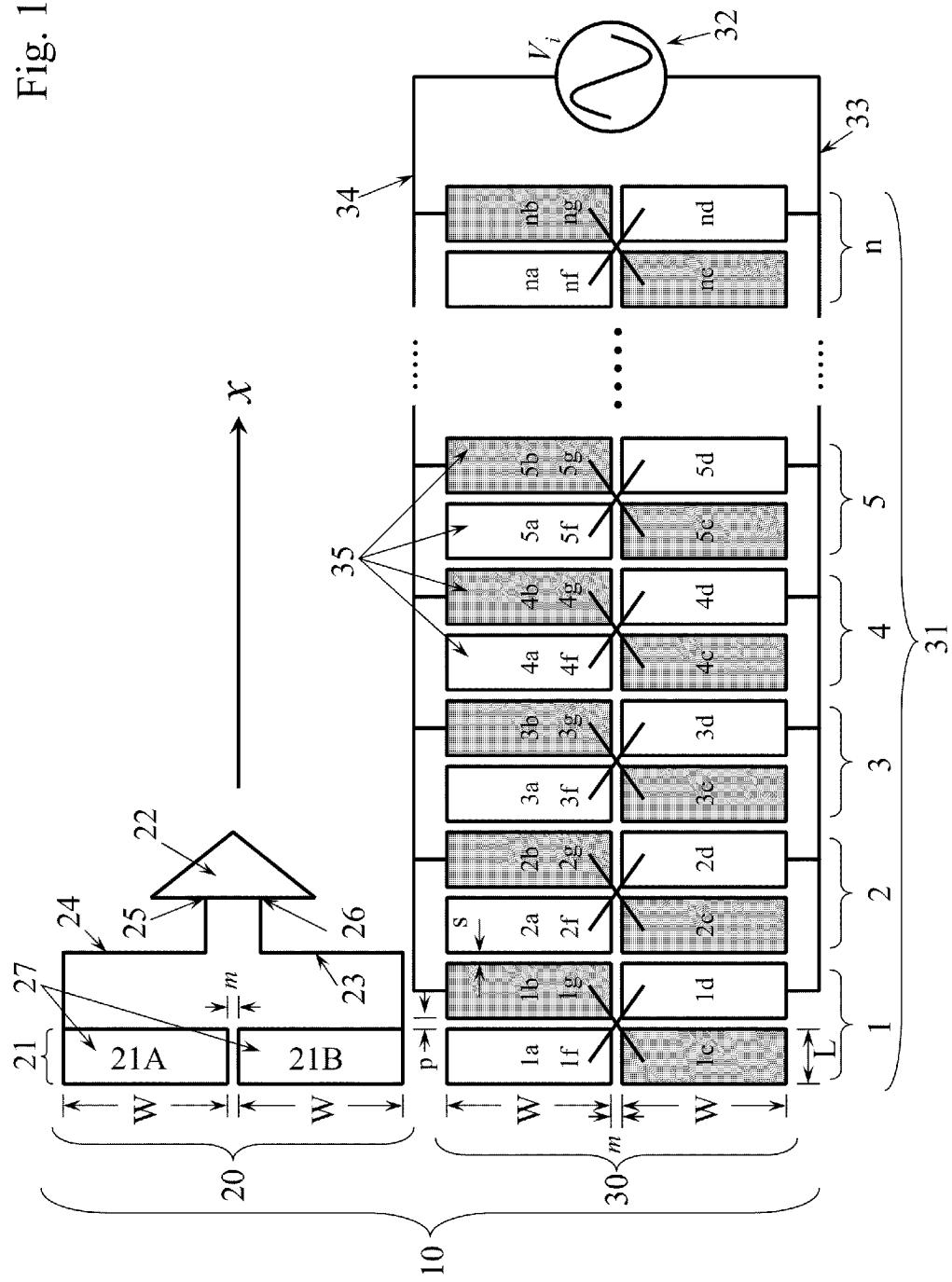
FIG. 1 depicts a view of exemplary mobile and stationary sensor components of an exemplary symmetrical differential capacitive sensor of the present invention.

FIG. 1 provides a view of exemplary mobile and stationary sensor components of an exemplary symmetrical differential capacitive sensor of the present invention. As shown in FIG. 1, exemplary symmetrical differential capacitive sensor 10 comprises an array 30 and a first mobile sensor component 20. Array 30 comprises two or more sets 31 of stationary conductive surfaces (n sets are shown in FIG. 1) extending in a first direction x with each set (i.e., sets 1, 2, 3, 4, 5, up to n sets) being separated from one another by a first distance s. Each set of stationary conductive surfaces (i.e., sets 1, 2, 3, 4, 5, up to n sets) comprises four conductive surfaces a, b, c and d (i) separated from one another in the first direction x by a second distance p and separated from one another in a second direction y by a third distance m, the second direction y being perpendicular to the first direction x, and (ii) electrically coupled to one another via pairs of connectors f and g (e.g., 1f and 1g, 2f and 2g, . . . nf and ng) to form two equipotential bridged pairs of stationary conductive surfaces a-d and b-c (e.g., 1a-1d and 1b-1c, 2a-2d and 2b-2c, . . . na-nd and nb-nc) per set. The combination of all of the equipotential bridged pairs of stationary conductive surfaces a-d and b-c (e.g., 1a-1d and 1b-1c, 2a-2d and 2b-2c, . . . na-nd and nb-nc) results in an outer array surface 35.

Figure 2:
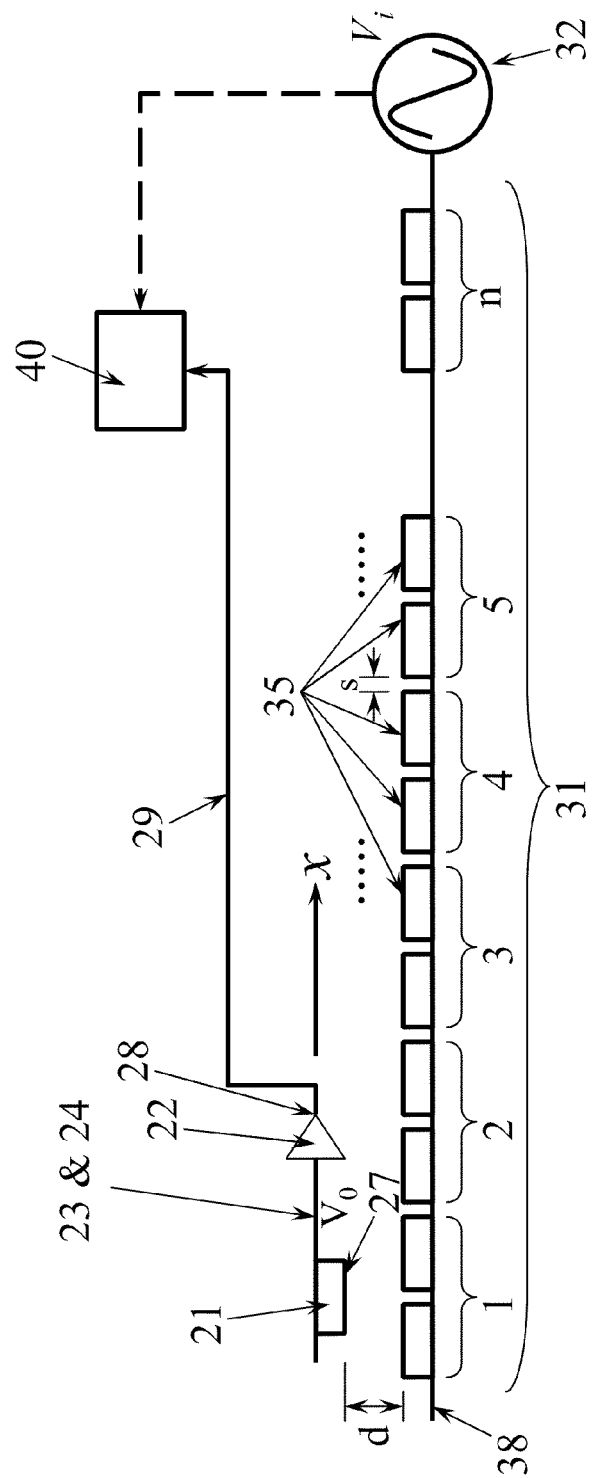
FIG. 2 depicts a side view of the exemplary mobile and stationary sensor components shown in FIG. 1 positioned relative to one another during use.

Exemplary symmetrical differential capacitive sensor 10 further comprises first mobile sensor component 20. Exemplary first mobile sensor component 20 comprises a single set of first mobile sensing components in the form of at least one pair 21 of side-by-side first mobile conductive surfaces A-B (e.g., 21A and 21B) (i) positioned a gap distance d from array 30 (as shown in FIG. 2) and (ii) movable relative to array 30 (as shown in FIG. 2) in the first direction x. Each of first mobile conductive surfaces A and B (e.g., 21A and 21B) of a given pair 21 of conductive surfaces A-B is separated from one another by third distance m (i.e., comprising a non-conductive, insulating material). The combination of all pairs of first mobile conductive surfaces (e.g., 21A and 21B) results in an outer first mobile sensor component surface 27.

As shown in FIG. 1, exemplary symmetrical differential capacitive sensor 10 further comprises a voltage source 32 operatively adapted to provide modulating voltage to array 30; electrical connector 33 extending from the two or more sets of equipotential bridged pairs of stationary conductive surfaces a-d (e.g., 1a-1d, 2a-2d, . . . na-nd) to voltage source 32, and electrical connector 34 extending from the two or more sets of equipotential bridged pairs of stationary conductive surfaces b-c (e.g., 1b-1c, 2b-2c, . . . nb-nc) to voltage source 32; a first differential amplifier 22 having two first inputs 25 and 26 and a first output (i.e., first output 28 shown in FIG. 2) for measuring a first potential difference between the two first inputs 25 and 26; electrical connector 24 extending from each of the first mobile conductive surfaces A (e.g., 21A) to one of the two first inputs (i.e., first input 25) of first differential amplifier 22, and electrical connector 23 extending from each of the first mobile conductive surfaces B (e.g., 21B) to another of the two first inputs (i.e., first input 26) of first differential amplifier 22.

FIG. 2 provides a side view of exemplary first mobile sensor component 20 positioned relative to array 30. As shown in FIG. 2, first mobile sensor component 20 is (i) positioned a gap distance d from array 30 and (ii) movable relative to array 30 in the first direction x so that outer first mobile sensor component surface 27 of first mobile sensor component 20 faces outer array surface 35 of array 30. Exemplary individual sets 1 to n of stationary conductive surfaces a, b, c and d are positioned along substrate 38. FIG. 2 also depicts and a first synchronous detector 40 coupled to the first output 28 of the first differential amplifier 22 via connector 29.

Referring to FIG. 1, each of the exemplary stationary conductive surfaces a, b, c and d and the exemplary first mobile conductive surfaces A and B has (a) a substantially similar conductive surface area, $A_{cs}$, and (b) a substantially similar conductive surface shape. In exemplary symmetrical differential capacitive sensor 10, each of the exemplary stationary conductive surfaces a, b, c and d and the exemplary first mobile conductive surfaces A and B has a conductive surface length L extending along the first direction x, a conductive surface width W extending along the second direction y, and the conductive surface area $A_{cs}$ equals (L)×(W). Further, in exemplary symmetrical differential capacitive sensor 10, each of the exemplary stationary conductive surfaces a, b, c and d and the exemplary first mobile conductive surfaces A and B has a rectangular surface shape although other surface shapes may be used. Suitable other surface shapes include, but are not limited to, a triangular surface shape, a rectangular surface shape, a circular surface shape, or other shapes that may better fit the geometries of specific applications.

Each of the exemplary stationary conductive surfaces a, b, C and d and the exemplary first mobile conductive surfaces A and B may have dimensions (e.g., L and W) that may vary depending on the ultimate use of the symmetrical differential capacitive sensor. In addition, first, second and third distances s, p and m may also vary to some degree, but are each desirably relatively small distances compared to the dimensions of exemplary stationary conductive surfaces a, b, c and d and the exemplary first mobile conductive surfaces A and B.

Typically, in the symmetrical differential capacitive sensors of the present invention, conductive surface length L ranges from about 10 μm to about 10 mm; conductive surface width W ranges from about 10 mm to about 100 mm; distances s, p and m each independently ranges from about 0.1 μm to about 100 μm; and gap distance d ranges from about 100 nm to about 100 μm. In some embodiments, conductive surface length L is about 100 μm; conductive surface width W is about 10 mm; distances s, p and m each independently are about 0.1 μm; and gap distance d is about 100 nm.

Each of the exemplary stationary conductive surfaces a, b, c and d and the exemplary first mobile conductive surfaces A and B may be formed from any conductive material. Suitable conductive materials include, but are not limited to, metallic thin films such as Au, Cu, Al, etc. Typically, the conductive material is deposited onto a substrate in a repeating pattern. Suitable substrates include, but are not limited to, flat insulating substrates such as glass, sapphire, and other common dielectric substrates. Buffer layers may be used between the conductive surfaces and the flat insulating substrate for better lattice match and improved durability of the conductive surfaces. Suitable materials for forming one or more buffer layers include, but are not limited to chrome (Cr), which is a suggested material for positioning between Au/Ag and glass for strong attachment.

Referring to FIG. 2, as exemplary first mobile sensor component 20 moves along outer array surface 35 of array 30 at a fixed gap distance d from array 30, a capacitance bridge results from coupling between (1) first mobile conductive surfaces 21A and 21B and (2) stationary conductive surfaces a, b, c and d of the two or more sets 31 of stationary conductive surfaces. An exemplary capacitance bridge is illustrated in FIG. 3.

Figure 3:
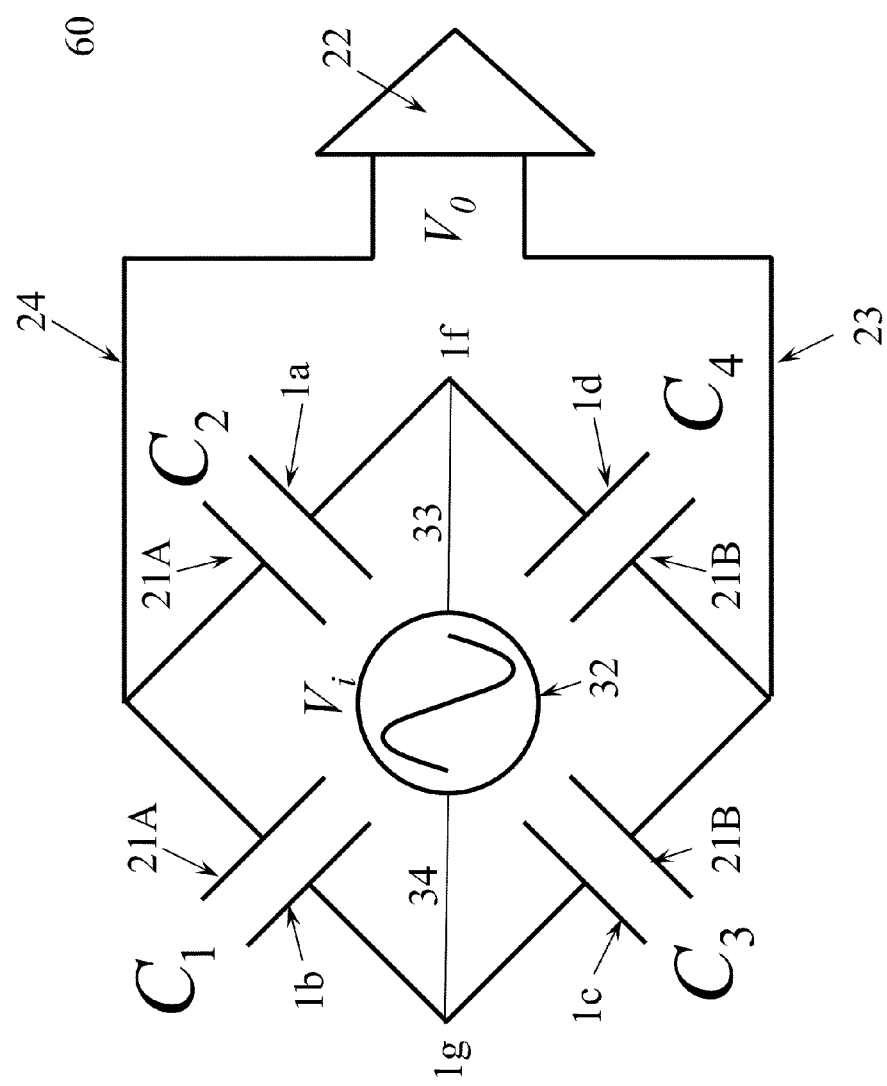
FIG. 3 depicts an exemplary capacitance bridge that illustrates electrical interaction between (i) conductive surfaces of the exemplary mobile sensor component shown in FIG. 2 and (ii) conductive surfaces of the exemplary stationary sensor component shown in FIG. 2 when the exemplary mobile sensor component is positioned along the exemplary stationary sensor component.

As shown in FIG. 3, exemplary capacitance bridge 60 comprises four capacitors $C_1$, $C_2$, $C_3$ and $C_4$ resulting from the following coupling of an interacting set of conductive surfaces, for example: $C_1$ from 21A-1b coupling; $C_2$ from 21A-1a coupling; $C_3$ from 21B-1c coupling; and $C_4$ from 21B-1d coupling. When first mobile sensor component 20 moves in the first direction x along outer array surface 35 of array 30 at a fixed gap distance d from array 30, the areas of 21A-1a ($C_2$) and 21B-1c ($C_3$) coupling are reduced and the areas of 21A-1b ($C_1$) and 21B-1d ($C_4$) coupling are increased. The signal from first differential amplifier 22 is then proportional to ($C_2-C_4$)=($C_3-C_1$) or displacement of first mobile sensor component 20. Since the variation in capacitances is essentially linear to the change of the coupling areas, which is linear to the linear displacement, the first differential amplifier 22 detects a voltage that is linearly proportional to the displacement of first mobile sensor component 20. If the motion of first mobile sensor component 20 is reversed, the capacitances change in an opposite manner, and first differential amplifier 22 detects a voltage varying in an opposite direction.

Figure 4:
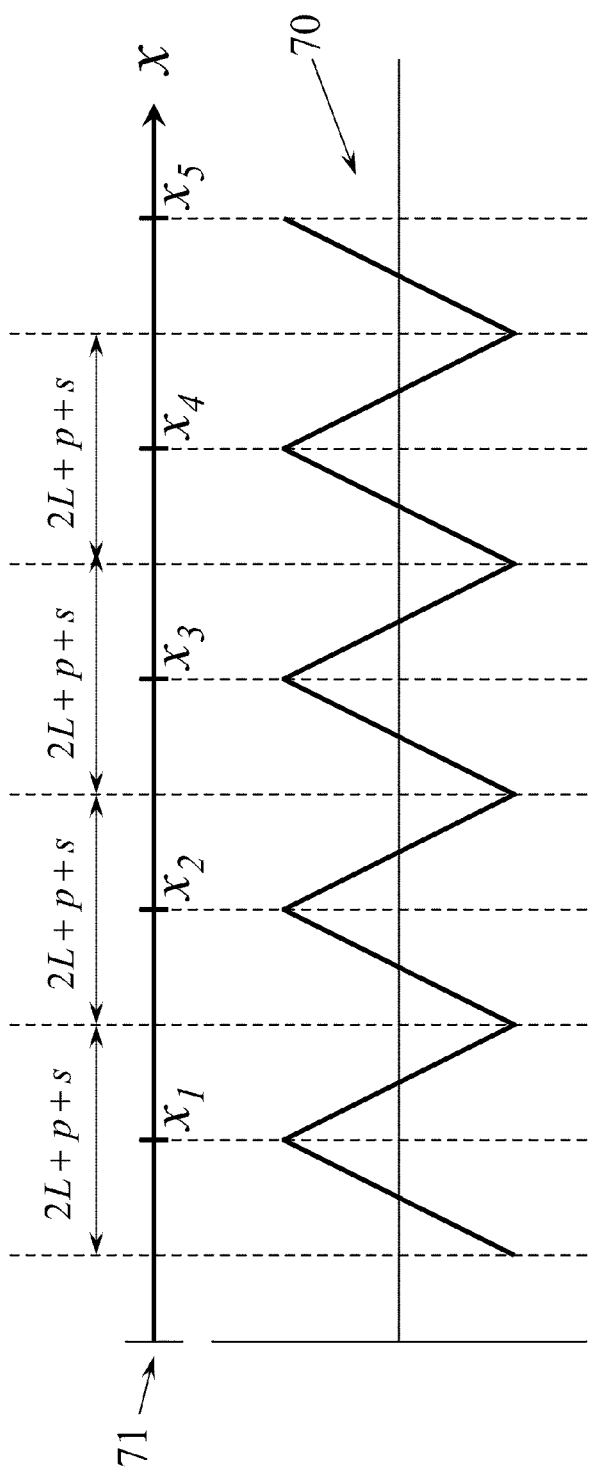
FIG. 4 depicts an exemplary signal pattern resulting from movement of the exemplary mobile sensor component shown in FIG. 2 along the exemplary stationary sensor component shown in FIG. 2.

As exemplary first mobile sensor component 20 moves in first direction x across array 30, the capacitive bridge responds in a periodic manner and first differential amplifier 22 outputs a signal pattern as a function of position along array 30 as shown in FIG. 4. Pattern 70 is referred to herein as "fringes" for reasons similar to the analogous phenomenon in optical interferometers. Points $x_1$ to $x_5$ shown along line 71 represent identical positions within corresponding individual sets 1 to 5 of stationary conductive surfaces along array 30. By knowing the number of repeating fringes and the distance (i.e., length) of each individual set (i.e., individual sets 1, 2, 3, 4, 5, up to n sets) within sets 31 of stationary conductive surfaces (e.g., (L+s) as shown in FIG. 4), a distance traveled by first mobile sensor component 20 across array 30 may be determined.

To minimize electrostatic noise in the above-described circuitry of exemplary symmetrical differential capacitive sensor 10, low-noise coaxial BNC cables may be used in place of movable wires (e.g., electrical connectors 23 and 24).

Figure 5A:
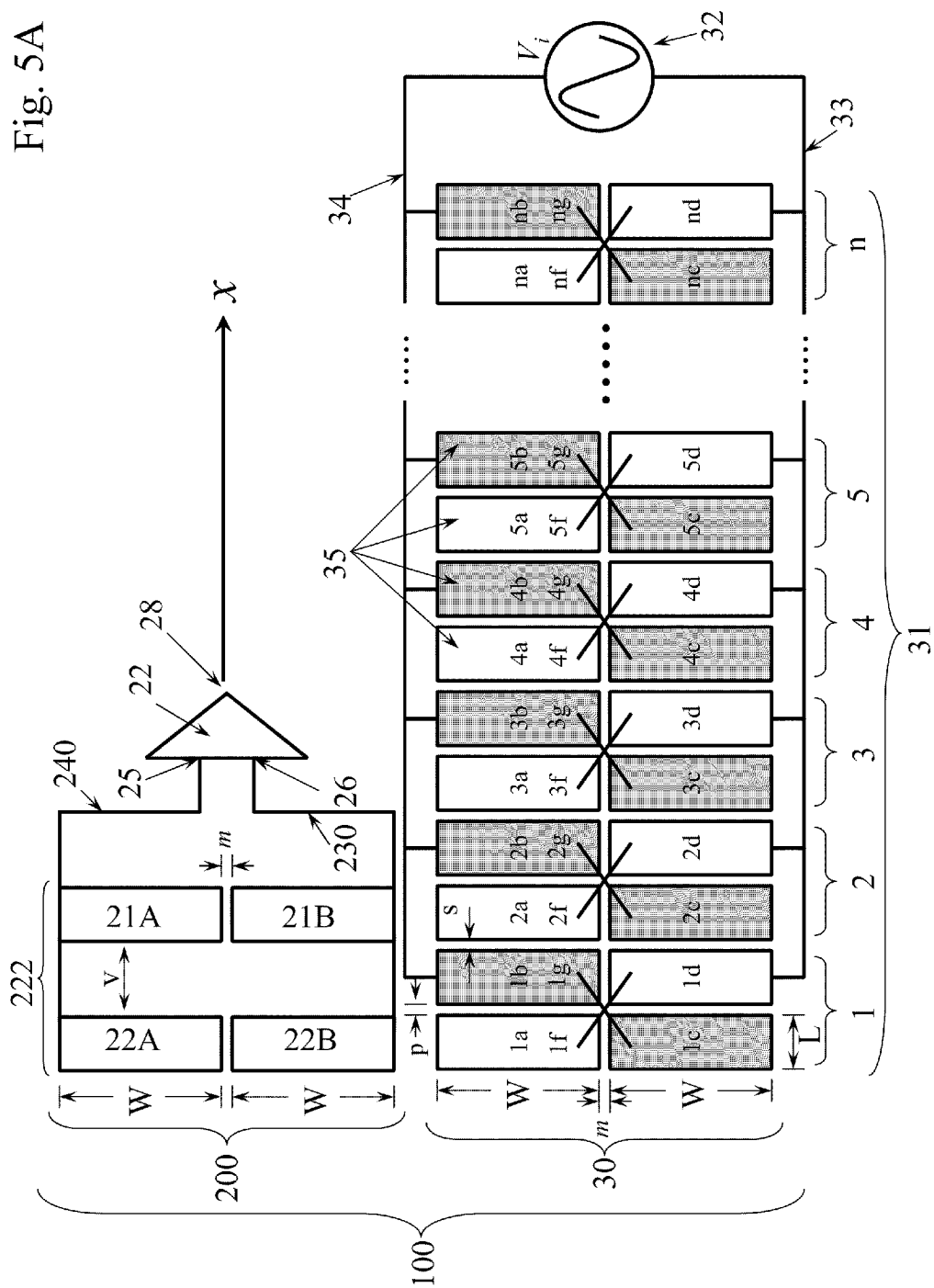
FIG. 5A depicts a view of exemplary mobile and stationary sensor components of another exemplary symmetrical differential capacitive sensor of the present invention.
Figure 5B:
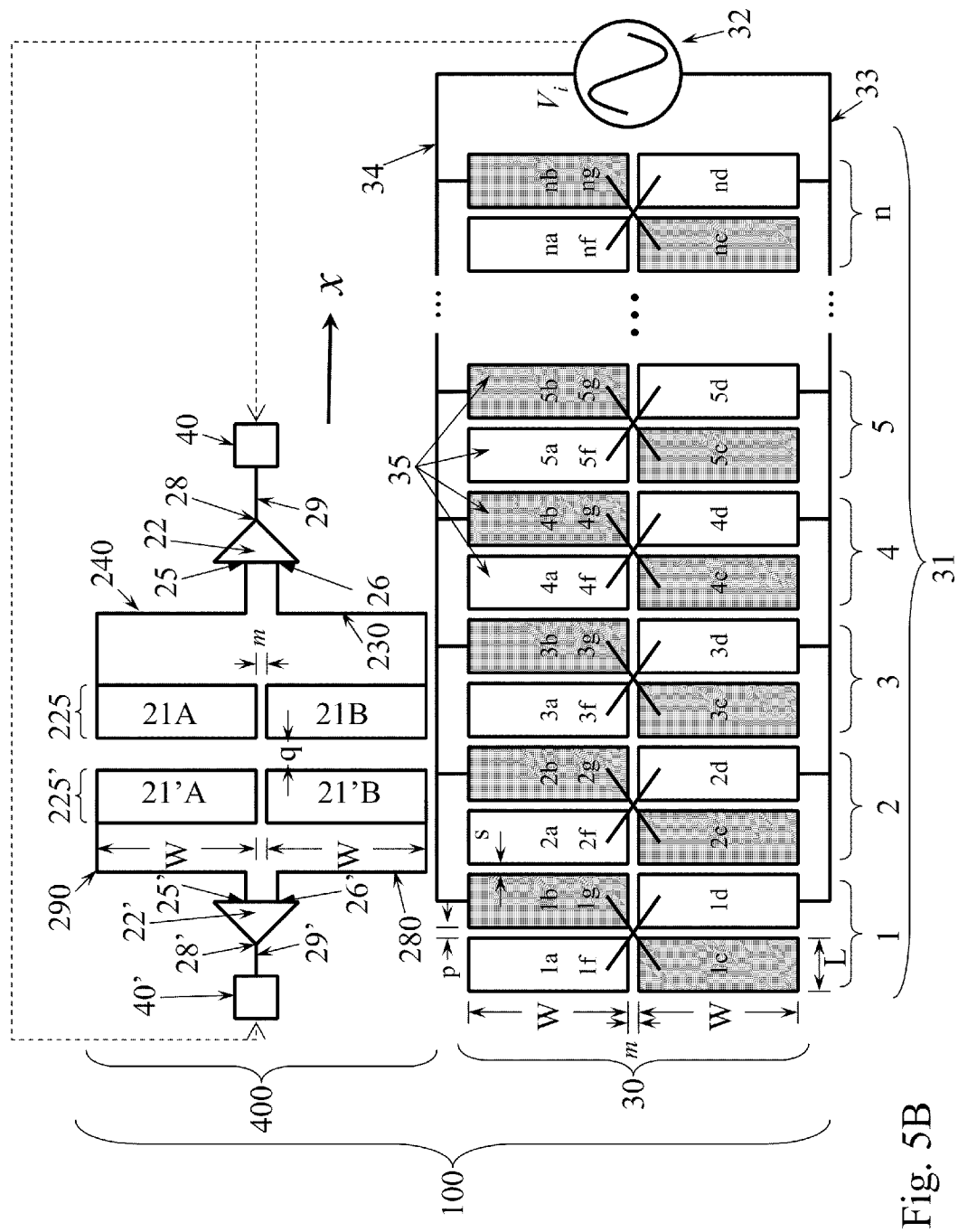
FIG. 5B depicts a view of exemplary mobile and stationary sensor components of another exemplary symmetrical differential capacitive sensor of the present invention.

The principles described above with reference to exemplary symmetrical differential capacitive sensor 10 may also be applied to other symmetrical differential capacitive sensors of the present invention such as exemplary symmetrical differential capacitive sensor 100 shown in FIG. 5A and exemplary symmetrical differential capacitive sensor 200 shown in FIG. 5B.

As shown in FIG. 5A, exemplary symmetrical differential capacitive sensor 100 comprises array 30, which is identical to array 30 as shown in FIG. 1. In this exemplary embodiment, exemplary first mobile sensor component 200 comprising a set 222 of first mobile sensing components (e.g., conductive surfaces 21A, 21B, 22A and 22B), wherein set 222 of first mobile sensing components comprises at least one pair of side-by-side first mobile conductive surfaces A-B (i.e., two pairs of side-by-side first mobile conductive surfaces $A_1$-$B_1$ and $A_2$-$B_2$ depicted as pair 21A-21B and pair 22A-22B). As discussed above, set 222 of first mobile sensing components is (i) positioned a gap distance d from array 30 (i.e., in a similar position as first mobile sensor component 20 shown in FIG. 2) and (ii) movable relative to array 30 in the first direction x. Further, as shown in FIG. 5A, each first mobile conductive surface A and B of a given pair of conductive surfaces A-B (e.g., conductive surfaces 21A, 21B, 22A and 22B) is separated from one another by third distance m.

Exemplary symmetrical differential capacitive sensor 100 also comprises (1) first differential amplifier 22 for set 222 of first mobile sensing components, wherein first differential amplifier 22 has two first inputs 25 and 26 and a first output 28 for measuring a potential difference between two first inputs 25 and 26; (2) a pair of electrical connectors for set 222 of first mobile sensing components, each pair comprising (i) an electrical connector 240 extending from first mobile conductive surface(s) A (e.g., conductive surfaces 21A and 22A) to one of the two first inputs (i.e., first input 25) of associated first differential amplifier 22, and (ii) an electrical connector extending from first mobile conductive surface(s) B (e.g., conductive surfaces 21B and 22B) to another of the two first inputs (i.e., first input 26) of associated first differential amplifier 22; and (3) a first synchronous detector (not shown) for first differential amplifier 22, wherein each first synchronous detector is coupled to first output 28 of associated first differential amplifier 22. In exemplary symmetrical differential capacitive sensor 100, each of the stationary conductive surfaces a, b, c and d and the first mobile conductive surfaces A and B (e.g., each of first mobile conductive surfaces 21A, 21B, 22A and 22B) has (a) a substantially similar conductive surface area, $A_{cs}$, and (b) a substantially similar conductive surface shape.

As shown in FIG. 5A, exemplary symmetrical differential capacitive sensor 100 provides an exemplary symmetrical differential capacitive sensor of the present invention having a first mobile sensor component, namely, exemplary first mobile sensor component 200 with a single set of first mobile sensing components (i.e., set 222) in the form of two pairs of first mobile conductive surfaces 21A-21B and 22A-22B. One advantage of this embodiment is an increase in overall mobile sensing area compared to the single pair of first mobile conductive surfaces 21A-21B present in first mobile sensor component 20 shown in FIG. 1.

It should be noted that although first mobile sensor component 200 of exemplary symmetrical differential capacitive sensor 100 comprises two pairs of first mobile conductive surfaces 21A-21B and 22A-22B, other first mobile sensor components may comprise more than two pairs of first mobile conductive surfaces within a given set (i.e., within set 222). Regardless of whether two or more pairs of first mobile conductive surfaces within a given set (i.e., within set 222), each pair of first mobile conductive surfaces (e.g., first mobile conductive surfaces 21A-21B, 22A-22B . . . nA-nB) is separated from each other pair of first mobile conductive surfaces in the x direction by distance v, wherein v is equal to (L+p+s).

Another exemplary symmetrical differential capacitive sensor is shown in FIG. 5B. As shown in FIG. 5B, exemplary symmetrical differential capacitive sensor 300 comprises array 30 and voltage source 32, which are identical to array 30 and voltage source 32 as shown in FIG. 1. In this exemplary embodiment, exemplary first mobile sensor component 400 two sets of first mobile sensing components 225 and 225' (i) positioned a gap distance d from array 30 (i.e., in a similar position as first mobile sensor component 20 shown in FIG. 2), and (ii) movable relative to array 30 in the first direction x. One set of first mobile sensing components 225 comprises at least one pair of side-by-side first mobile conductive surfaces $A_1$-$B_1$ (e.g., a single pair of side-by-side first mobile conductive surfaces $A_1$-$B_1$, two pairs of side-by-side first mobile conductive surfaces $A_1$-$B_1$ and $A_2$-$B_2$, or more than two pairs of side-by-side first mobile conductive surfaces $A_1$-$B_1$ to $A_n$-$B_n$)(shown as a single pair of side-by-side first mobile conductive surfaces 21A-21B in FIG. 5B). Another set of first mobile sensing components 225' comprises at least one pair of side-by-side first mobile conductive surfaces $A'_1$-$B'_1$ (e.g., a single pair of side-by-side first mobile conductive surfaces $A'_1$-$B'_1$, two pairs of side-by-side first mobile conductive surfaces $A'_1$-$B'_1$ and $A'_2$-$B'_2$, or more than two pairs of side-by-side first mobile conductive surfaces $A'_1$-$B'_1$ to $A'_n$-$B'_n$) (shown as a single pair of side-by-side first mobile conductive surfaces 21'A-21'B in FIG. 5B). Each first mobile conductive surface A and B of a given pair of conductive surfaces A-B or A'-B' (e.g., first mobile conductive surfaces 21A and 21B, and first mobile conductive surfaces 21'A-21'B) is separated from one another by the third distance m.

In this exemplary embodiment, first mobile conductive surfaces $A_n$-$B_n$ (e.g., first mobile conductive surfaces 21A and 21B of set 225) are separated from first mobile conductive surfaces $A'_n$-$B'_n$ (e.g., first mobile conductive surfaces 21'A and 21'B of set 225') by a fourth distance q equal to (i+½)(L+p), where i is an integer greater than or equal to zero, and L is a length as measured in the first direction x of each stationary conductive surface.

Exemplary symmetrical differential capacitive sensor 300 further comprises (1) first differential amplifiers $FDA_1$ and $FDA_2$ (shown as first differential amplifiers 22 and 22') for each of the two sets of first mobile sensing components 225 and 225', wherein each first differential amplifier 22 and 22' has two first inputs (i.e., first inputs 25 and 26 for first differential amplifier 22, and first inputs 25' and 26' for first differential amplifier 22') and a first output (i.e., first output 28 for first differential amplifier 22, and first output 28' for first differential amplifier 22') for measuring a potential difference between the two first inputs; (2) electrical connectors (i) extending from each of the first mobile conductive surfaces $A_n$ to one of the two first inputs of first differential amplifier $FDA_1$ (i.e., electrical connector 240), (ii) extending from each of the first mobile conductive surfaces $B_n$ to another of the two first inputs of first differential amplifier $FDA_1$ (i.e., electrical connector 230), (iii) extending from each of the first mobile conductive surfaces $A'_n$ to one of the two first inputs of first differential amplifier $FDA_2$ (i.e., electrical connector 290), and (iv) extending from each of the first mobile conductive surfaces $B'_n$ to another of the two first inputs of first differential amplifier $FDA_2$ (i.e., electrical connector 280); and (3) first synchronous detectors $FSD_1$ and $FSD_2$ (shown as first differential amplifiers 40 and 40' in FIG. 5B) coupled to the first output of first differential amplifiers $FDA_1$ and $FDA_2$ respectively. Each of the stationary conductive surfaces a, b, c and d and the first mobile conductive surfaces $A_n$, $A'_n$, $B_n$ and $B'_n$ (e.g., first mobile conductive surfaces 21A, 21B, 21'A and 21'B) has (a) a substantially similar conductive surface area, $A_{cs}$, and (b) a substantially similar conductive surface shape.

In this exemplary embodiment, a second set of mobile conductive surfaces 225' identical to the first set of mobile conductive surfaces 225 is employed but shifted a distance (i+½)(L+p) from the set of mobile conductive surfaces 225, where i is any integer greater than or equal to zero and L is the width of the electrodes as discussed above (e.g., as in first mobile sensor component 200). This second set of mobile conductive surfaces 225' produces a fringe pattern with π/2 phase shift from the first set of mobile conductive surfaces 225 and responds linearly at the turning points of the first set of mobile conductive surfaces 225. With appropriate programs and/or electronics, one can easily switch reading from either set of mobile conductive surfaces to avoid the blindspots (i.e., turning points in the "fringes") and maintain a directly linear response to displacement of a given sensor.

Figure 6A:
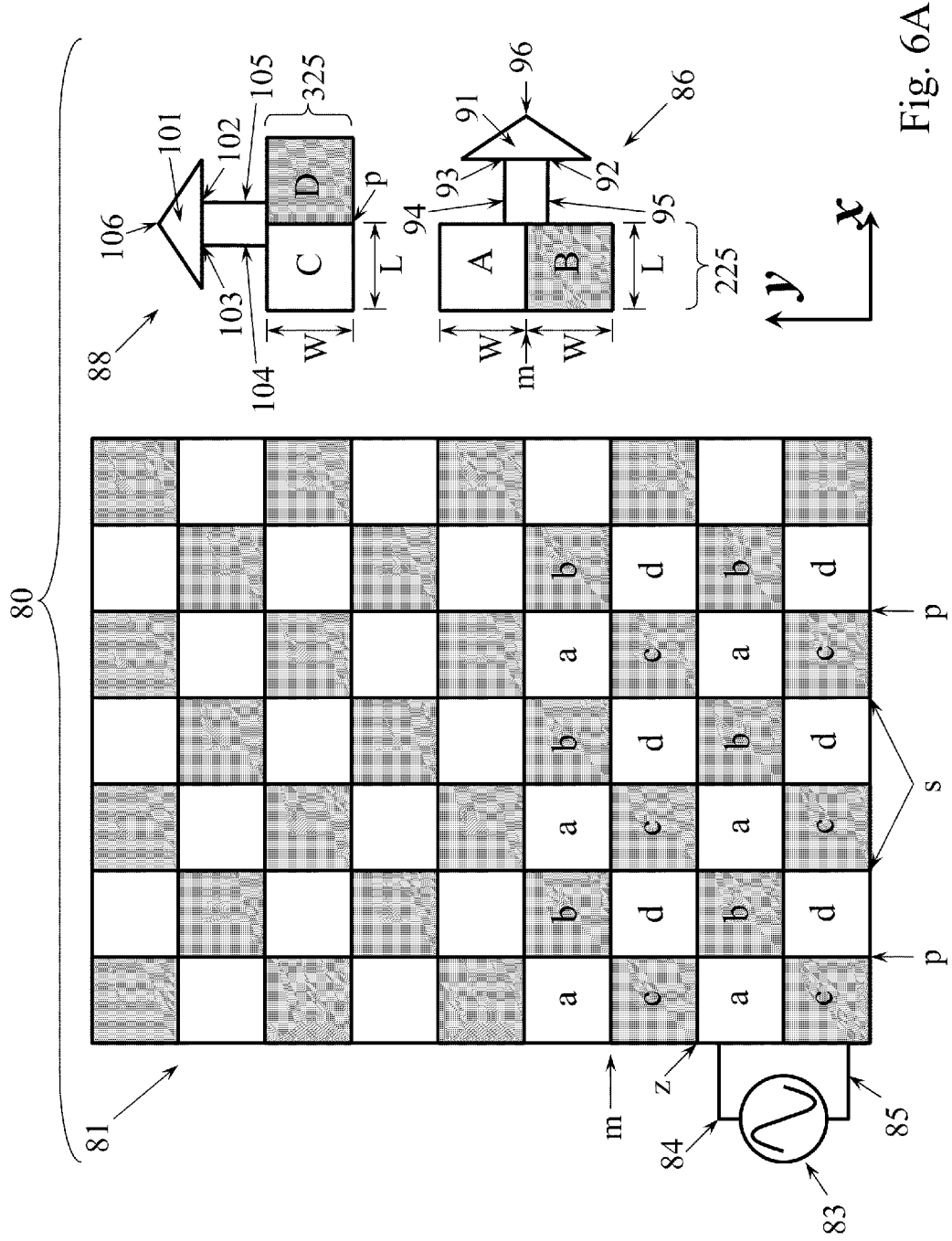
FIG. 6A depicts a view of exemplary mobile and stationary sensor components of another exemplary symmetrical differential capacitive sensor of the present invention.

In another exemplary embodiment of the present invention, the symmetrical differential capacitive sensor comprises an array in the form of a grid of sets of stationary conductive surfaces a-d extending in a first direction x and a second direction y, the second direction y being perpendicular to the first direction x. Such a symmetrical differential capacitive sensor is depicted in FIG. 6A. As shown in FIG. 6A, exemplary symmetrical differential capacitive sensor 80 comprises array 81 in the form of a grid of sets of stationary conductive surfaces a-d extending in a first direction x and a second direction y, the second direction y being perpendicular to the first direction x. Each set of stationary conductive surfaces a-d extending in the first direction x are separated from one another by a first distance s and each set of stationary conductive surfaces a-d extending in the second direction y are separated from one another by a fourth distance z. Each set of stationary conductive surfaces comprise four conductive surfaces a, b, c and d (i) separated from one another in the first direction x by a second distance p and separated from one another in a second direction y by the third distance m, and (ii) electrically coupled to one another to form two equipotential bridged pairs of stationary conductive surfaces a-d and b-c.

Exemplary symmetrical differential capacitive sensor 80 further comprises a voltage source 83 operatively adapted to provide modulating voltage to array 81, electrical connector 84 extending from the four or more sets of equipotential bridged pairs of stationary conductive surfaces a-d to voltage source 83, and electrical connector 85 extending from the four or more sets of equipotential bridged pairs of stationary conductive surfaces b-c to voltage source 83.

Exemplary symmetrical differential capacitive sensor 80 also comprises (1) an exemplary first mobile sensor component 86 comprising at least one set of first mobile sensing components 225, wherein each set of first mobile sensing components comprises at least one pair of side-by-side first mobile conductive surfaces A-B (i) positioned a gap distance d from array 81 and (ii) movable relative to array 81 in the first direction x, wherein each first mobile conductive surface A and B of a given pair of conductive surfaces A-B is separated from one another by the third distance m; (2) a first differential amplifier 91 having two first inputs (e.g., inputs 92 and 93) and a first output (e.g., output 96) for measuring a first potential difference between the two first inputs (e.g., inputs 92 and 93); (3) electrical connectors (i) extending from each of the first mobile conductive surfaces A (e.g., electrical connector 94) to one of the two first inputs (e.g., input 93) of first differential amplifier 91, and (ii) extending from each of the first mobile conductive surfaces B (e.g., electrical connector 95) to another of the two first inputs (e.g., input 92) of first differential amplifier 91; and (4) a first synchronous detector (not shown; similar to first synchronous detector 40 shown in FIG. 2) coupled to first output 96 of the first differential amplifier.

In this exemplary embodiment, exemplary symmetrical differential capacitive sensor 80 also comprises (1) an exemplary second mobile sensor component 88 comprising at least one set of second mobile sensing components 325, wherein each set of second mobile sensing components comprises at least one pair of side-by-side second mobile conductive surfaces C-D (i) positioned the gap distance d from array 81 and (ii) movable relative to array 81 in the second direction y, wherein each second mobile conductive surface C and D of a given pair of conductive surfaces C-D is separated from one another by the second distance p; (2) a second differential amplifier 101 having two second inputs (e.g., inputs 102 and 103) and a second output (e.g., output 106) for measuring a second potential difference between the two second inputs (e.g., inputs 102 and 103); (3) electrical connectors (i) extending from each of the second mobile conductive surfaces C (e.g., electrical connector 104) to one of the two second inputs (e.g., input 103) of second differential amplifier 101, and (ii) extending from each of the second mobile conductive surfaces D (e.g., electrical connector 105) to another of the two second inputs (e.g., input 102) of second differential amplifier 101; and (4) a second synchronous detector (not shown; similar to first synchronous detector 40 shown in FIG. 2) coupled to second output 106 of second differential amplifier 101.

It should be noted that each of exemplary first mobile sensor component 86 and exemplary second mobile sensor component 88 may each independently comprise a mobile sensor component having a construction similar to (i) exemplary first mobile sensor component 20 shown in FIG. 1 or (ii) exemplary first mobile sensor component 200 shown in FIG. 5A (i.e., exemplary first mobile sensor component 86 comprises a single set of mobile sensing components 225 comprising two pairs of side-by-side mobile conductive surfaces $A_1$-$B_1$ and $A_2$-$B_2$ separated from one another by (L+p+s) and exemplary second mobile sensor component 88 comprises a single set of mobile sensing components 325 comprising two pairs of side-by-side mobile conductive surfaces $C_1$-$D_1$ and $C_2$-$D_2$ separated from one another by (W+m+z)) or (iii) exemplary first mobile sensor component 400 shown in FIG. 5B (i.e., two separate sets 225 and 225' with each set having at least one pair of side-by-side mobile conductive surfaces $A_1$-$B_1$ and $A'_1$-$B'_1$ respectively and each set 225 and 225' separated from one another by (i+½)(L+p) for exemplary first mobile sensor component 86, and two separate sets 325 and 325' with each set having at least one pair of side-by-side mobile conductive surfaces $C_1$-$D_1$ and $C'_1$-$D'_1$ separated from one another by (j+½)(W+m) for exemplary second mobile sensor component 88).

Figure 6B:
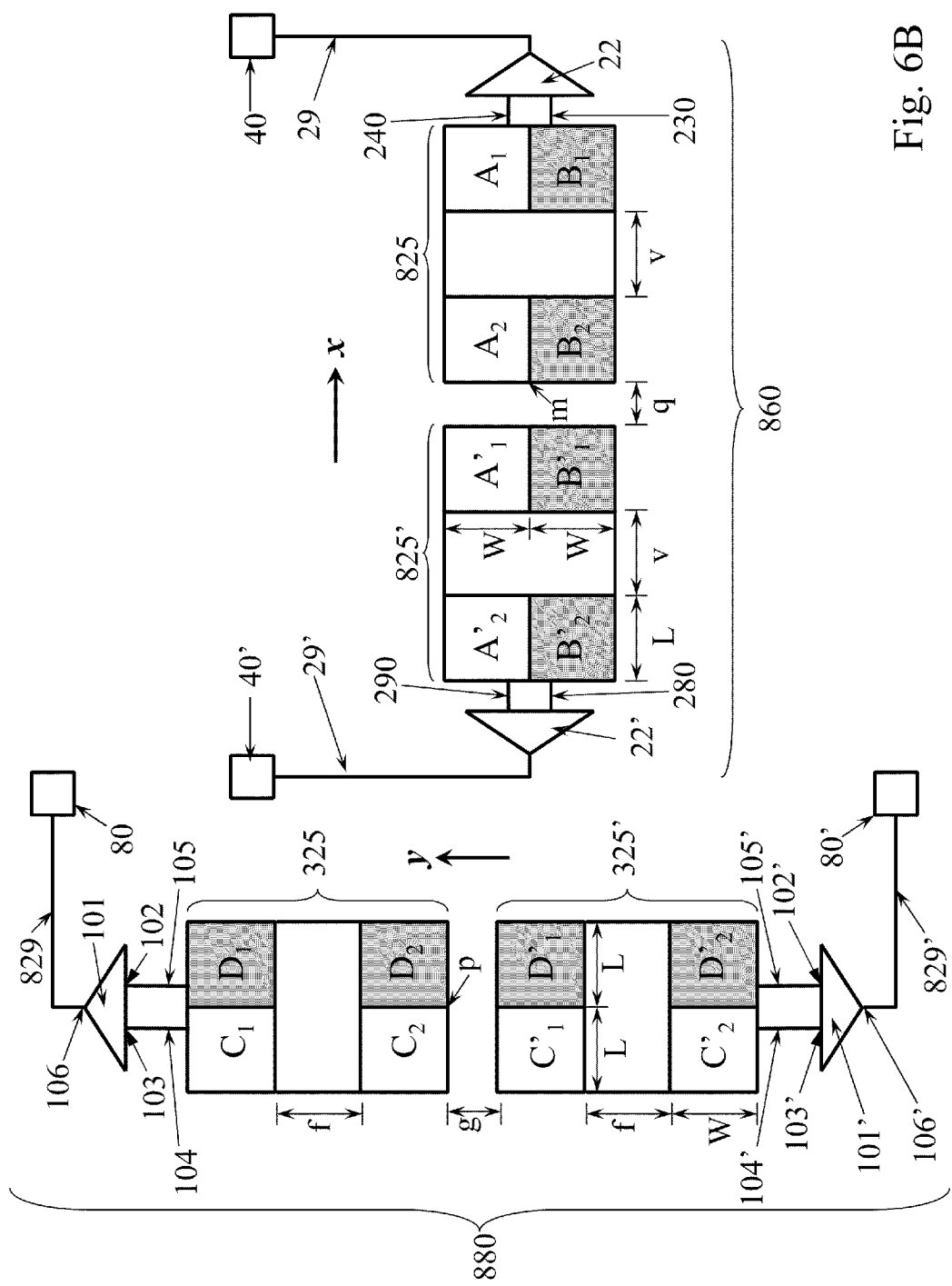
FIG. 6B depicts a view of exemplary mobile sensor components suitable for use with the stationary sensor component shown in FIG. 6A.

FIG. 6B provides a view of other exemplary first and second mobile sensor components suitable for use with stationary sensor component 81 shown in FIG. 6A. As shown in FIG. 6B, exemplary first mobile sensor component 860 comprises two sets of first mobile sensing components 825 and 825' (i) positioned a gap distance d from array 81 (i.e., in a similar position as first mobile sensor component 20 shown in FIG. 2), and (ii) movable relative to array 81 in the first direction x. In this exemplary embodiment, one set of first mobile sensing components 825 comprises two pairs of side-by-side first mobile conductive surfaces $A_1$-$B_1$ and $A_2$-$B_2$. Another set of first mobile sensing components 825' comprises two pairs of side-by-side first mobile conductive surfaces $A'_1$-$B'_1$ and $A'_2$-$B'_2$. Each of first mobile conductive surfaces A and B of a given pair of conductive surfaces A-B or A'-B' is separated from one another by the third distance m.

First mobile conductive surfaces $A_n$-$B_n$ within set 825 are separated from first mobile conductive surfaces A'n-B'n within set 825' by fourth distance q equal to (i+½)(L+p), where i is an integer greater than or equal to zero, and L is a length as measured in the first direction x of each stationary conductive surface.

Exemplary first mobile sensor component 860 further comprises (1) first differential amplifiers $FDA_1$ and $FDA_2$ (shown as first differential amplifiers 22 and 22') for each of the two sets of first mobile sensing components 825 and 825', wherein each first differential amplifier 22 and 22' has two first inputs (i.e., first inputs 25 and 26 for first differential amplifier 22, and first inputs 25' and 26' for first differential amplifier 22') and a first output (i.e., first output 28 for first differential amplifier 22, and first output 28' for first differential amplifier 22') for measuring a potential difference between the two first inputs; (2) electrical connectors (i) extending from each of the first mobile conductive surfaces $A_n$ within set 825 (e.g., $A_1$ and $A_2$) to one of the two first inputs of first differential amplifier $FDA_1$ (i.e., electrical connector 240), (ii) extending from each of the first mobile conductive surfaces $B_n$ within set 825 (e.g., $B_1$ and $B_2$) to another of the two first inputs of first differential amplifier FDA$_1$ (i.e., electrical connector 230), (iii) extending from each of the first mobile conductive surfaces A'$_n$ within set 825' (e.g., A'$_1$ and A'$_2$) to one of the two first inputs of first differential amplifier FDA$_2$ (i.e., electrical connector 290), and (iv) extending from each of the first mobile conductive surfaces B'$_n$ within set 825' (e.g., B'$_1$ and B'$_2$) to another of the two first inputs of first differential amplifier FDA$_2$ (i.e., electrical connector 280); and (3) first synchronous detectors FSD$_1$ and FSD$_2$ (shown as first differential amplifiers 40 and 40' in FIG. 6B) coupled to the first output of first differential amplifiers FDA$_1$ and FDA$_2$ respectively.

As shown in FIG. 6B, exemplary second mobile sensor component 880 comprises two sets of second mobile sensing components 325 and 325' (i) positioned a gap distance d from array 81 (i.e., in a similar position as first mobile sensor component 20 shown in FIG. 2), and (ii) movable relative to array 81 in the second direction y. In this exemplary embodiment, one set of second mobile sensing components 325 comprises two pairs of side-by-side first mobile conductive surfaces C$_1$-D$_1$ and C$_2$-D$_2$. Another set of second mobile sensing components 325' comprises two pairs of side-by-side first mobile conductive surfaces C'$_1$-D'$_1$ and C'$_2$-D'$_2$. Each second mobile conductive surface C and D of a given pair of conductive surfaces C-D or C'-D' is separated from one another by the distance p.

Second mobile conductive surfaces C$_n$-D$_n$ within set 325 are separated from second mobile conductive surfaces C'n-D'$_n$ within set 325' by distance g equal to (j+½)(W+m), where j is an integer greater than or equal to zero, and W is a length as measured in the second direction y of each stationary conductive surface.

Exemplary second mobile sensor component 880 further comprises (1) second differential amplifiers SDA$_1$ and SDA$_2$ (shown as second differential amplifiers 101 and 101') for each of the two sets of second mobile sensing components 325 and 325', wherein each second differential amplifier 101 and 101' has two second inputs (i.e., second inputs 103 and 102 for second differential amplifier 80, and second inputs 103' and 102' for second differential amplifier 101') and a second output (i.e., second output 106 for second differential amplifier 101, and second output 106' for second differential amplifier 101') for measuring a potential difference between the two second inputs; (2) electrical connectors (i) extending from each of the second mobile conductive surfaces C$_n$ within set 325 (e.g., C$_1$ and C$_2$) to one of the two second inputs of second differential amplifier SDA$_1$ (i.e., electrical connector 104), (ii) extending from each of the second mobile conductive surfaces D$_n$ within set 325 (e.g., D$_1$ and D$_2$) to another of the two second inputs of second differential amplifier SDA$_1$ (i.e., electrical connector 105), (iii) extending from each of the second mobile conductive surfaces C'$_n$ within set 325' (e.g., C'$_1$ and C'$_2$) to one of the two second inputs of second differential amplifier SDA$_2$ (i.e., electrical connector 104'), and (iv) extending from each of the second mobile conductive surfaces D'$_n$ within set 325' (e.g., D'$_1$ and D'$_2$) to another of the two second inputs of second differential amplifier SDA$_2$ (i.e., electrical connector 105'); and (3) second synchronous detectors SSD$_1$ and SSD$_2$ (shown as second differential amplifiers 80 and 80' in FIG. 6B) coupled to the second output of second differential amplifiers SDA$_1$ and SDA$_2$ respectively.

In the exemplary embodiment shown in FIG. 6B, each of the stationary conductive surfaces a, b, c and d, the first mobile conductive surfaces A$_n$, A'$_n$, B$_n$, B'$_n$ (e.g., first mobile conductive surfaces A$_1$, A$_2$, B$_1$, B$_2$, A'$_1$, A'$_2$, B'$_1$ and B'$_2$) and the second mobile conductive surfaces C$_n$, C'$_n$, D$_n$, D'$_n$ (e.g., second mobile conductive surfaces C$_1$, C$_2$, D$_1$, D$_2$, C'$_1$, C'$_2$, D'$_1$, and D'$_2$) has (a) a substantially similar conductive surface area, A$_{cs}$, and (b) a substantially similar conductive surface shape.

As discussed above, although exemplary first mobile sensor component 860 and exemplary second mobile sensor component 880 are each shown as having two sets of mobile conductive surfaces comprising two pairs of side-by-side first mobile conductive surfaces, other exemplary first and second mobile sensor components may comprise as few as a single set of mobile conductive surfaces comprising a single pair of side-by-side first mobile conductive surfaces or multiple sets of mobile conductive surfaces with each set comprising at least one pair of side-by-side first mobile conductive surfaces, and each pair A$_n$-B$_n$ separated from one another by (L+p+s) and each pair C$_n$-D$_n$ separated from one another by (W+m+z).

The present invention is also directed to methods of making symmetrical differential capacitive sensors symmetrical differential capacitive sensors such as the above-described exemplary sensors. In one exemplary embodiment, the method of making a symmetrical differential capacitive sensor comprises forming an array (e.g., array 30 or array 81) of two or more sets of stationary conductive surfaces (e.g., sets 1 to n) extending in a first direction x along a planar surface (e.g., substrate 38) with each set being separated from one another by a first distance s, and each set of stationary conductive surfaces comprising four conductive surfaces a, b, c and d (i) separated from one another in the first direction x by a second distance p and (ii) separated from one another in a second direction y by a third distance m, the second direction y being perpendicular to the first direction x.

The method of making a symmetrical differential capacitive sensor further comprises electrically coupling (i) conductive surfaces a and d to one another (i.e., via connectors f) and (ii) conductive surfaces b and c to one another (i.e., via connectors g) to form two equipotential bridged pairs of stationary conductive surfaces a-d and b-c per set; providing a voltage source (e.g., voltage source 32 or 83) operatively adapted to provide modulating voltage; providing electrical connectors (i) extending from the two or more sets of equipotential bridged pairs of stationary conductive surfaces a-d to the voltage source (e.g., electrical connector 33 or 84), and (ii) extending from the two or more sets of equipotential bridged pairs of stationary conductive surfaces b-c to the voltage source (e.g., electrical connector 34 or 85); forming a first mobile sensor component (e.g., exemplary first mobile sensor component 20 or 200 or 400 or 86 or 860) comprising at least one set of first mobile sensing components, wherein each set of first mobile sensing components comprises at least one pair of side-by-side first mobile conductive surfaces A-B, wherein each first mobile conductive surface A and B of a given pair of conductive surfaces A-B is separated from one another by the third distance m; positioning the first mobile sensor component a gap distance d from the array (e.g., array 30 or array 81) so as to be movable relative to the array in the first direction x; providing a first differential amplifier set of first mobile sensing components, wherein each first differential amplifier has two first inputs (e.g., inputs 25 and 26 alone or in combination with inputs 25' and 26') and a first output (e.g., output 28 alone or in combination with output 28') for measuring a potential difference between the two first inputs; providing a pair of electrical connectors for each set of first mobile sensing components, each pair comprising (i) an electrical connector extending from first mobile conductive surface(s) A to one of the two first inputs of an associated first differential amplifier, and (ii) an electrical connector extending from first mobile conductive surface(s) B to another of the two first inputs of the associated first differential amplifier; and coupling a first synchronous detector for each first differential amplifier (e.g., first synchronous detector 40 or the combination of first synchronous detectors 40 and 40') to the first output of the first differential amplifier (e.g., output 28 or 28 and 28').

In the above-described exemplary method of making a symmetrical differential capacitive sensor, it is highly desirable to form conductive surfaces so that each of the stationary conductive surfaces a, b, c and d and the first mobile conductive surfaces A and B has (a) a substantially similar conductive surface area, $A_{cs}$, and (b) a substantially similar conductive surface shape.

Exemplary methods of making symmetrical differential capacitive sensors of the present invention may further comprise one or more of the following method steps in addition to the above-mentioned method steps:

(1) forming at least one mobile sensor component that comprises at least one set of mobile sensing components, wherein each set comprises two pairs of side-by-side mobile conductive surfaces $A_1$-$B_1$ and $A_2$-$B_2$ (or $C_1$-$D_1$ and $C_2$-$D_2$) (i) extending along a first direction x or a second direction y, and (ii) separated from one another by a distance v or f wherein v equals (L+p+s), and L is a length of a conductive surface as measured in the x direction and s is a distance between adjacent sets of stationary conductive surfaces, and wherein f equals (W+m+z), and W is a length of a conductive surface as measured in the y direction and z is a distance between adjacent sets of stationary conductive surfaces;

(2) forming an array in the form of a grid of sets of stationary conductive surfaces a-d extending in a first direction x and a second direction y, wherein sets of stationary conductive surfaces a-d extending in the first direction x and second direction y are separated from one another by a distance (i.e., occupied by an insulating material);

(3) forming a second mobile sensor component comprising at least one set of second mobile sensing components, wherein each set comprises at least one pair of side-by-side second mobile conductive surfaces C-D (i) positioned a gap distance d above an array and (ii) movable relative to the array in the second direction y, wherein each second mobile conductive surface C and D of a given pair of conductive surfaces C-D is separated from one another by a distance p;

(4) providing a differential amplifier for each set of mobile sensing components, wherein each differential amplifier has two inputs and an output for measuring a potential difference between the two inputs, and a pair of electrical connectors for each set of mobile sensing components with each pair comprising (i) an electrical connector extending from each of the mobile conductive surfaces (e.g., A or C) to one of the two inputs of each associated differential amplifier, and (ii) an electrical connector extending from each of the mobile conductive surfaces (e.g., B or D) to another of the two inputs of each associated differential amplifier; and (5) providing a synchronous detector for each differential amplifier, wherein each synchronous detector is coupled to the output of an associated differential amplifier; and (6) assembling the various components with one another to form a given differential capacitive sensor.

The step of forming an array of conductive surfaces may comprise any deposition process capable of depositing conductive material onto a substrate in a precise pattern. Suitable deposition processes include, but are not limited to, vapor deposition, printing, chemical etching, photo-lithography, and electron-beam lithography.

The present invention is even further directed to methods of using symmetrical differential capacitive sensors such as the above-described exemplary sensors in a variety of applications. Suitable applications include, but are not limited to, massive fabrication of nano-scale components, nano-scale research and diagnosis, and scanning stages for research and industrial purposes. In any of the above-referenced applications, the above-described mobile sensor (or sensors) is attached to a moving component whose motion is to be monitored. For example, possible moving components include, but are not limited to, a moving plate of a translational stage, a scanning probe of a microscope, etc.

In one exemplary embodiment, the method of using a symmetrical differential capacitive sensor comprises (I) moving a first mobile sensor component of a symmetrical differential capacitive sensor (e.g., exemplary first mobile sensor component 20 or 200 or 400 or 86 or 860) from a first point along an array (e.g., exemplary array 30 or array 81) in a first direction x to a second point along the array (e.g., array 30 or array 81), the symmetrical differential capacitive sensor comprising any one of the above-described symmetrical differential capacitive sensors (e.g., exemplary symmetrical differential capacitive sensor 10, 100, 300, or 80); and (II) converting a first signal output from a first synchronous detector (e.g., first synchronous detector 40) into a first calculated distance between the first point and the second point in the x direction.

The method of using a symmetrical differential capacitive sensor may comprise measuring a distance between two points in an x-y plane using a symmetrical differential capacitive sensor as described above with reference to FIG. 6A (e.g., exemplary symmetrical differential capacitive sensor 80), wherein the method comprises moving a first mobile sensor component (e.g., exemplary first mobile sensor component 86) from a first point along the array (e.g., exemplary array 81) in the first direction x to a second point along the array, the second point corresponding to an x-coordinate of a position along the x-y plane; converting a first signal output from a first synchronous detector into a first calculated distance between the first point and the second point; moving a second mobile sensor component (e.g., exemplary second mobile sensor component 88) from the first point along the array (e.g., exemplary array 81) in the second direction y to a third point along the array, the third point corresponding to a y-coordinate of the position along the x-y plane; converting a second signal output from the second synchronous detector into a second calculated distance between the first point and the third point; and using the first calculated distance and the second calculated distance to determine the distance between the first point and the position along the x-y plane.

The above-described methods of measuring a distance between two points in an x-y plane may be used to measure a distance between a first point and another position along an x-y plane, wherein the distance is up to 500 mm. Typically, sensors of the present invention may be used to measure a distance between a first point and another position along an x-y plane that ranges from about 0.5 nm to about 100 mm with an accuracy of within 0.5 nm.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

Figure 7:
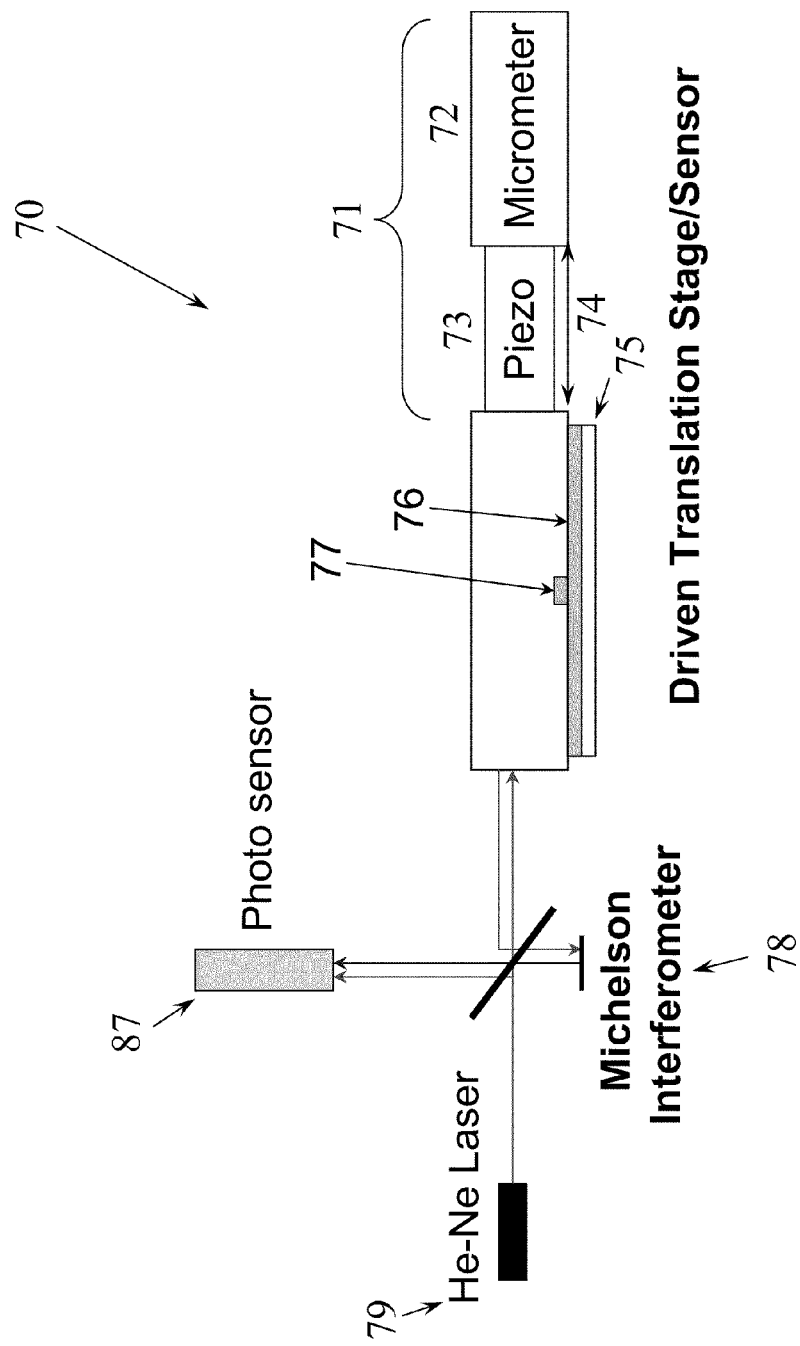
FIG. 7 depicts an exemplary apparatus used in the Examples to detect and record movement of an exemplary mobile sensor component relative to an exemplary and stationary component of an exemplary symmetrical differential capacitive sensor of the present invention.

An apparatus 70 as shown in FIG. 7 was prepared. A hybrid motion drive 71 was built with a micrometer 72 having 10 μm resolution and a piezo drive 73 with responses ~2 μm per 100 V. Piezo-drive 73 was mounted on a linear-translation stage 74, which was driven by micrometer 72. Capacitive sensors (i.e., array 76 and mobile sensor component 77 were placed on another linear-translation stage 75 driven by the hybrid drive 71. Array 76 was mounted on a stationary part of stage 75, and a short array of four pairs of conductive surfaces (not shown) (i.e., mobile sensor component 77) was mounted on a sliding top (not shown). The width, L, of stripes of conductive surface material (not shown) was about 1 mm. The whole assembly was spring-loaded to minimize backlash.

With limited mechanical expertise and facilities to make a structure for holding the capacitor plates (not shown) of array 76 with a fixed gap, the plates were mounted to stage 75 with strong shear-resisting double-sided tapes (not shown). The double-sided tapes also acted as the spring load as the plates were pressed against each other with a layer of 10 μm thick MYLAR® film (not shown) in the middle as the spacer additional to protective lacquer layers on the plates. To further reduce mechanical vibrations that could unexpectedly alter the gap, the whole assembly was placed on an air-supported optics table (not shown).

To minimize electrostatic noises built up along the cables (not shown), which make low-level voltage measurements (≦100 μV) impossible, low-noise BNC cables designed for low level nano-volt measurements were used instead of conventional BNC cables, which typically produce a few hundred micro-volts of noise. Since the de-modulation detection operated on the same principle as a lock-in amplifier, the internal oscillator of an SRS 830 digital lock-in amplifier (not shown) was used as the modulator and the lock-in amplifier (not shown) was used for detection and amplification. A 14-bit analog-to-digital converter (ADC) (not shown) was used to record the signal on a computer.

In sub-μm scale tests, the inelastic nature of the double-sided tape (not shown) became a critical issue due to the demand of uncertain relaxation time associated with mechanical creep. The sensor's signals continued to drift due to the relaxation process causing the plates to slowly move relatively to each other after the position of the stage was set. To minimize this effect, the plates were re-mounted permanently to the stage with JB Weld® epoxy so that the sensor signal would truly reflect the stage positions and therefore be calibrated with the optical interferometer. In this set up, the gap between the plates was not as uniform and small due to lacking of the spring-loaded pressure between the plates, and the "fringes" were not exactly repeatable in their amplitudes. Nonetheless, it provided more stable signals to analyze.

The capacitive sensor was calibrated at fine scales (≦10 μm) with a Michelson-type optical interferometer 78 using a He—Ne laser 79 with wavelength=632.8 nm.

Figure 8:
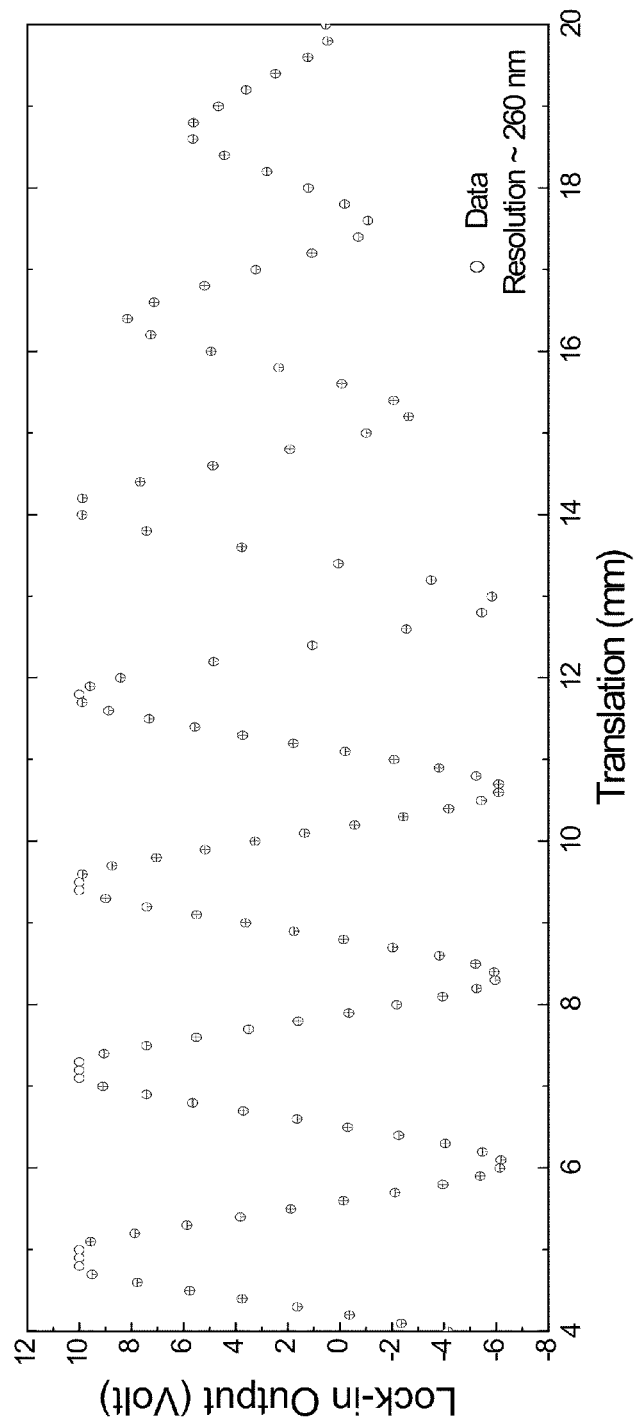
FIG. 8 depicts a plot of sensor output signal (i.e., voltage) as the sensor moves along the exemplary stationary component in the exemplary apparatus of FIG. 7.

Coarse Motion Test:

The first experiment performed was a coarse motion driven merely by micrometer 72 to observe the repeating "fringe" pattern on the readout signal. FIG. 8 shows data for coarse motion traveling about 1.6 cm across stationary array 76. The mobile plate 77 entered long stationary array 76 from the right side of the plot, so a well-repeated pattern did not show until the whole mobile part 77 was coupled to the stationary array 76.

The stationary array 76 was driven by a 38.6-volt AC signal at 100 kHz. The sensor readout was detected by the SRS830 (not shown) with a time constant 300 ms, sensitivity=1 V, and phase=90°. The output range of the SRS830 was ±10 V corresponding to ±1 V, which was set by the sensitivity. The phase differed from zero mainly because of the transformer that was used to increase drive voltage.

FIG. 8 showed that the recorded lock-in output signals from the SRS830 was stable and only vary within 5 mV, which was close to the digital resolution of the ADC, 1.2 mV. The slope of the linear operational range, which occupied at least 80% of the fringes (except for the turning points), were about 19.2 V/mm and varied about ±5%. This variation was caused by two major factors. The first was the geometrical irregularity among the repeating units, which was inevitable because of the limited fabrication capability. Therefore, the capacitive coupling varied slightly from one unit to the other. Another important factor was the difficulty in maintaining a uniform gap between the plates throughout the motion. Although efforts were made to minimize the gap variation by inserting a sheet of MYLAR® as a spacer, the protective lacquer layers were not be as uniform as anticipated. Though the technical difficulty disallowed an invariant linear slope for all operational ranges, the resolution achieved with this coarse motion test by a micrometer alone could still be estimated. With the ~19.2 V/mm ratio for the operational ranges and ~5 mV noise, the sensor resolution in the coarse-motion mode was 260 μm. This could be improved significantly with an ADC of better hit-resolutions and narrower strips on the capacitive plates.

The sensor appeared to have inoperable ranges due to the nonlinear nature of the fringe pattern at the "turning points." However, this issue is readily resolved by employing a second mobile array identical to the first one but shifted with (i+½)(L+p), where i is an integer and L is the width of the electrodes as discussed above (and as illustrated with first mobile sensor component 200).

Fine Motion Test:

To determine the spatial resolution of the sensor, the stationary array 76 shown in FIG. 7 was mounted with JB Weld® epoxy to the translation stage 75, which was driven over a range of ~10 μm by piezo-drive 73, whose piezo-response was ~2 μm per 100 V. Since piezo-drive 73 was calibrated more than ten years ago, the calibration information was used merely as a reference, and not as the exact determination of the displacements of the stage.

The translation stage 75 was first moved by micrometer 72 to a position where the sensor read-out (not shown) was close to zero. This preparation was needed because of the limited dynamic range of the lock-in amplifier (not shown). The stage 75 was then driven by piezo-drive 73; the stationary array 76 was driven by a 64.7-volt AC signal and the sensitivity of lock-in detection was set at 20 mV to detect the low level signals from the sensor.

Figure 9:
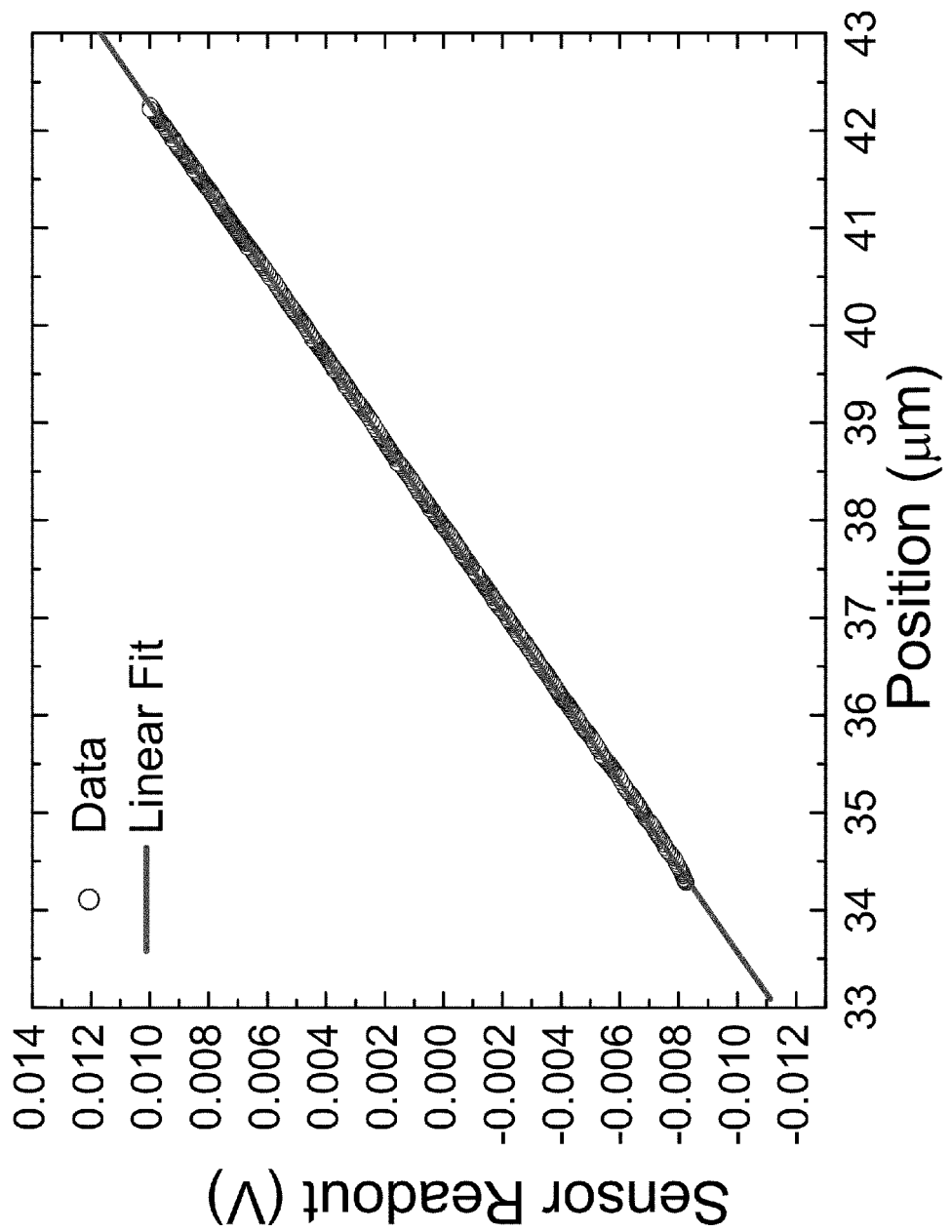
FIG. 9 depicts a plot of sensor output signal (i.e., voltage) as a function of position along the exemplary stationary component as the exemplary mobile sensor component in the exemplary apparatus of FIG. 7 moves along the exemplary stationary component.

FIG. 9 shows the lock-in output signals as a function of position. The absolute positions were determined by the optical interferometer 78. The linear ratio of ~2.30 μV/nm was with respect to the signal from the sensor and the superior linearity of R=0.999931 showed the advantage in direct metrology. The signals from the lock-in amplifier (not shown) were not as stable as in the coarse motion, and varied on the scale of 10 mV (corresponding to ~50 μV in the signal from the sensor), which was significantly larger than the digital resolution of the ADC (~1.2 mV) (not shown), indicating additional noise in the system.

This rather large uncertainty was mainly due to the mechanical stability. The sensor response was very sensitive to the capacitive coupling. To eliminate the relaxation problem associated with the double-sided tapes, the sensor was mounted to the stage with unremovable JB Weld® epoxy. However, by doing so, it became extremely difficult to maintain a uniform and stable capacitive gap, which was now subjected to residual mechanical vibrations and fluctuations in temperature and humidity of the air. (The challenges presented due to the limited fabrication capabilities in the present example are easily resolved in a professional industrial setting for significant improvements.)

Even with the far-from-optimal mechanical structure, a calibrated resolution of ~25 nm by a low-resolution, educational grade, home-built interferometer was achieved with the linear ratio of ~2.30 μV/nm and uncertainty of ~50 μV. It should be noted that prior to the test in which the sensor was mounted with JB Weld® epoxy, a similar test for signal stability and noise was performed with the double-sided-tape mounting as used in the coarse motion test. With this more stable and uniform gap, the sensor signal only fluctuated at ~5 μV, which was 10 times smaller than the JB Weld® epoxy mounted sensor. Such signal stability suggested a 10 times better resolution (~2.5 nm) if a more stable and uniform gap were maintained by removing the effects of inelasticity. Another issue to be addressed was that the output signal from the lock-in amplifier was constantly drifting at a very slow rate. The drifting signal was believed to be caused by the phase instability from the internal oscillator of the lock-in and contributed significantly to the 5 μV uncertainty in the demodulated signals, which corresponded to the resolution of ~2.5 nm. This suggested that to achieve 0.01 nm resolution, stability within 20 nV in the demodulated signals was needed.

While stability at this scale may not be a big challenge to modern electronics, this requirement can be further loosened by having smaller gaps or greater modulation voltages, which will produce greater modulated signals across the mobile electrodes and therefore greater linear slope and less required stability for the same resolution.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A symmetrical differential capacitive sensor comprising:
    an array comprising a grid of sets of stationary conductive surfaces a-d extending in a first direction x and a second direction y with two or more sets of stationary conductive surfaces extending in the first direction x with each set being separated from one another by a first distance s, and two or more sets of stationary conductive surfaces a-d extending in the second direction y with each set being separated from one another by a distance z, each set of stationary conductive surfaces comprising four conductive surfaces a, b, c and d (i) separated from one another in the first direction x by a second distance p and separated from one another in a second direction y by a third distance m, the second direction y being perpendicular to the first direction x, and (ii) electrically coupled to one another to form two equipotential bridged pairs of stationary conductive surfaces a-d and b-c per set;
    a voltage source operatively adapted to provide modulating voltage to the array;
    electrical connectors (i) extending from the two or more sets of equipotential bridged pairs of stationary conductive surfaces a-d to the voltage source, and (ii) extending from the two or more sets of equipotential bridged pairs of stationary conductive surfaces b-c to the voltage source;
    a first mobile sensor component comprising at least one set of first mobile sensing components, wherein each set of first mobile sensing components comprises at least one pair of side-by-side first mobile conductive surfaces $A_n$-$B_n$ (i) positioned a gap distance d from the array and (ii) movable relative to the array in the first direction x, wherein each first mobile conductive surface A and B of a given pair of conductive surfaces $A_n$-B is separated from one another by the third distance m;
    a first differential amplifier for each set of first mobile sensing components, wherein each first differential amplifier has two first inputs and a first output for measuring a potential difference between the two first inputs;
    a pair of electrical connectors for each set of first mobile sensing components, each pair comprising (i) an electrical connector extending from first mobile conductive surface(s) A to one of the two first inputs of an associated first differential amplifier, and (ii) an electrical connector extending from first mobile conductive surface(s) B to another of the two first inputs of the associated first differential amplifier; and
    a first synchronous detector for each first differential amplifier, wherein each first synchronous detector is coupled to the first output of an associated first differential amplifier;
    a second mobile sensor component comprising at least one set of second mobile sensing components, wherein each set of second mobile sensing components comprises at least one pair of side-by-side second mobile conductive surfaces $C_n$-$D_n$ (i) positioned the gap distance d from the array and (ii) movable relative to the array in the second direction y, wherein each second mobile conductive surface C and D of a given pair of conductive surfaces $C_n$-$D_n$ is separated from one another by the second distance p;
    a second differential amplifier for each set of second mobile sensing components, wherein each second differential amplifier has having two second inputs and a second output for measuring a potential difference between the two second inputs;
    a pair of electrical connectors for each set of second mobile sensing components, each pair comprising (i) an electrical connector extending from second mobile conductive surface(s) C to one of the two second inputs of an associated second differential amplifier, and (ii) an electrical connector extending from second mobile conductive surface(s) D to another of the two second inputs of the associated second differential amplifier; and
    a second synchronous detector for each second differential amplifier, wherein each second synchronous detector is coupled to the second output of an associated second differential amplifier;
    wherein each of the stationary conductive surfaces a, b, c and d, the first mobile conductive surfaces A and B, and the second mobile conductive surfaces C and D has (a) a substantially similar conductive surface area, $A_{cs}$, and (b) a substantially similar conductive surface shape.

2. The symmetrical differential capacitive sensor of claim 1, wherein each of the stationary conductive surfaces a, b, c and d and the first mobile conductive surfaces A and B has a conductive surface length L extending along the first direction x, a conductive surface width W extending along the second direction y, and the conductive surface area $A_{cs}$ equals (L)×(W).

3. The symmetrical differential capacitive sensor of claim 2, wherein each of the stationary conductive surfaces a, b, c and d and the first mobile conductive surfaces A and B has a rectangular surface shape.

4. The symmetrical differential capacitive sensor of claim 2, wherein the first mobile sensor component comprises a single set of first mobile sensing components comprising two pairs of side-by-side first mobile conductive surfaces $A_1$-$B_1$ and $A_2$-$B_2$, wherein each pair $A_n$-$B_n$ (i) extends along the first direction x, and (ii) is separated from one another by a distance (L+p+s).

5. The symmetrical differential capacitive sensor of claim 2, wherein the first mobile sensor component comprises two sets of first mobile sensing components, a first set comprising at least one pair of side-by-side first mobile conductive surfaces $A_1$-$B_1$ and a second set comprising at least one pair of side-by-side first mobile conductive surfaces $A'_1$-$B'_1$, wherein each set (i) extends along the first direction x, and (ii) is separated from one another by a distance (i+½)(L+p) where i is an integer greater than or equal to zero.

6. The symmetrical differential capacitive sensor of claim 5, wherein conductive surface length L ranges from about 10 μm to about 10 mm; conductive surface width W ranges from about 10 mm to about 100 mm; distances s, p and m each independently ranges from about 0.1 μm to about 100 μm; and gap distance d ranges from about 0.1 μm to about 10 μm.

7. The symmetrical differential capacitive sensor of claim 5, wherein conductive surface length L is about 10 μm; conductive surface width W is about 10 mm; distances s, p and m each independently are about 0.1 μm; and gap distance d is about 0.1 mm.

8. The symmetrical differential capacitive sensor of claim 1, wherein (i) each of the stationary conductive surfaces a, b, c and d and the first mobile conductive surfaces A and B has a conductive surface length L extending along the first direction x, and a conductive surface width W extending along the second direction y, (ii) each of the second mobile conductive surfaces C and D has a conductive surface length L extending along the second direction y, and a conductive surface width W extending along the first direction x, and (iii) each of the stationary conductive surfaces a, b, c and d, the first mobile conductive surfaces A and B, and the second mobile conductive surfaces C and D has the conductive surface area $A_{cs}$ equals (L)×(W).

9. The symmetrical differential capacitive sensor of claim 8, wherein the first mobile sensor component comprises a single set of first mobile sensing components comprising two pairs of side-by-side first mobile conductive surfaces $A_1$-$B_1$ and $A_2$-$B_2$, wherein each pair $A_n$-$B_n$ (i) extends along the first direction x, and (ii) is separated from one another by a distance (L+p+s), and the second mobile sensor component comprises a single set of second mobile sensing components comprising two pairs of side-by-side second mobile conductive surfaces $C_1$-$D_1$ and $C_2$-$D_2$, wherein each pair $C_n$-$D_n$ (i) extends along the second direction y and (ii) is separated from one another by a distance (W+m+z).

10. The symmetrical differential capacitive sensor of claim 8, wherein the first mobile sensor component comprises two sets of first mobile sensing components, a first set comprising at least one pair of side-by-side first mobile conductive surfaces $A_1$-$B_1$ and a second set comprising at least one pair of side-by-side first mobile conductive surfaces $A'_1$-$B'_1$, wherein each set (i) extends along the first direction x, and (ii) is separated from one another by a distance (i+½)(L+p) where i is an integer greater than or equal to zero; and the second mobile sensor component comprises two sets of second mobile sensing components, a first set comprising at least one pair of side-by-side second mobile conductive surfaces $C_1$-$D_1$ and a second set comprising at least one pair of side-by-side second mobile conductive surfaces $C'_1$-$D'_1$, wherein each set (i) extends along the second direction y, and (ii) is separated from one another by a distance (j+½)(W+m).

11. The symmetrical differential capacitive sensor of claim 10, wherein conductive surface length L ranges from about 10 μm to about 10 mm; conductive surface width W ranges from about 10 μm to about 10 mm; distances s, p and m each independently ranges from about 0.1 μm to about 100 μm; and gap distance d ranges from about 0.1 μm to about 10 μm.

12. A method of measuring a distance between two points using the symmetrical differential capacitive sensor of claim 1, said method comprising:
moving the first mobile sensor component from a first point along the array in the first direction x to a second point along the array; and
converting first signal output from the first synchronous detector into a first calculated distance between the first point and the second point.

13. A method of measuring a distance between two points in an x-y plane using the symmetrical differential capacitive sensor of claim 1, said method comprising:
moving the first mobile sensor component from a first point along the array in the first direction x to a second point along the array, the second point corresponding to an x-coordinate of a position along the x-y plane;
converting a first signal output from the first synchronous detector into a first calculated distance between the first point and the second point;
moving the second mobile sensor component from the first point along the array in the second direction y to a third point along the array, the third point corresponding to a y-coordinate of the position along the x-y plane;
converting a second signal output from the second synchronous detector into a second calculated distance between the first point and the third point; and
using the first calculated distance and the second calculated distance to determine the distance between the first point and the position along the x-y plane.

14. A symmetrical differential capacitive sensor comprising:
an array of two or more sets of stationary conductive surfaces extending in a first direction x with each set being separated from one another by a first distance s, each set of stationary conductive surfaces comprising four conductive surfaces a, b, c and d (i) separated from one another in the first direction x by a second distance p and separated from one another in a second direction y by a third distance m, the second direction y being perpendicular to the first direction x, and (ii) electrically coupled to one another to form two equipotential bridged pairs of stationary conductive surfaces a-d and b-c per set;
a voltage source operatively adapted to provide modulating voltage to the array;
electrical connectors (i) extending from the two or more sets of equipotential bridged pairs of stationary conductive surfaces a-d to the voltage source, and (ii) extending from the two or more sets of equipotential bridged pairs of stationary conductive surfaces b-c to the voltage source;
a first mobile sensor component comprising two sets of first mobile sensing components (i) positioned a gap distance d from the array, and (ii) movable relative to the array in the first direction x, wherein one set of first mobile sensing components comprises at least one pair of side-by-side first mobile conductive surfaces $A_1$-$B_1$ and another set of first mobile sensing components comprises at least one pair of side-by-side first mobile conductive surfaces $A'_1$-$B'_1$, and wherein each first mobile conductive surface A and B of a given pair of conductive surfaces A-B or A'-B' is separated from one another by the third distance m, and first mobile conductive surfaces $A_n$-$B_n$ are separated from first mobile conductive surfaces $A'_n$-$B'_n$ by a fourth distance q equal to (i+½)(L+p), where i is an integer greater than or equal to zero, and L is a length as measured in the first direction x of each stationary conductive surface;

first differential amplifiers $FDA_1$ and $FDA_2$ for each of the two sets of first mobile sensing components, each first differential amplifier having two first inputs and a first output for measuring a potential difference between the two first inputs;

electrical connectors (i) extending from each of the first mobile conductive surfaces $A_n$ to one of the two first inputs of first differential amplifier $FDA_1$, (ii) extending from each of the first mobile conductive surfaces $B_n$ to another of the two first inputs of first differential amplifier $FDA_1$, (iii) extending from each of the first mobile conductive surfaces $A'_n$ to one of the two first inputs of first differential amplifier $FDA_2$, and (iv) extending from each of the first mobile conductive surfaces $B'_n$ to another of the two first inputs of first differential amplifier $FDA_2$; and first synchronous detectors $FSD_1$ and $FSD_2$ coupled to the first output of first differential amplifiers $FDA_1$ and $FDA_2$ respectively;

wherein each of the stationary conductive surfaces a, b, c and d and the first mobile conductive surfaces $A_n$, $A'_n$, $B_n$ and $B'_n$ has (a) a substantially similar conductive surface area, $A_{cs}$, and (b) a substantially similar conductive surface shape.

15. The symmetrical differential capacitive sensor of claim 14, wherein the array comprises a grid of sets of stationary conductive surfaces a-d extending in the first direction x and the second direction y, wherein sets of stationary conductive surfaces a-d extending in the second direction y are separated from one another by the third distance m, and the symmetrical differential capacitive sensor further comprises:

a second mobile sensor component comprising two sets of second mobile sensing components (i) positioned a gap distance d from the array, and (ii) movable relative to the array in the second direction y, wherein one set of second mobile sensing components comprises at least one pair of side-by-side second mobile conductive surfaces $C_1$-$D_1$ and another set of second mobile sensing components comprises at least one pair of side-by-side second mobile conductive surfaces $C'_1$-$D'_1$, and wherein each second mobile conductive surface C and D of a given pair of conductive surfaces C-D or C'-D' is separated from one another by distance p, and second mobile conductive surfaces $C_n$-$D_n$ are separated from second mobile conductive surfaces $C'_n$-$D'_n$ by a fifth distance g equal to (j+½)(W+m), where j is an integer greater than or equal to zero, and W is a length as measured in the second direction y of each stationary conductive surface;

second differential amplifiers $SDA_1$ and $SDA_2$ for each of the two sets of second mobile sensing components, each second differential amplifier having two second inputs and a second output for measuring a potential difference between the two second inputs;

electrical connectors (i) extending from each of the second mobile conductive surfaces $C_n$ to one of the two second inputs of second differential amplifier $SDA_1$, (ii) extending from each of the second mobile conductive surfaces $D_n$ to another of the two second inputs of second differential amplifier $SDA_1$, (iii) extending from each of the second mobile conductive surfaces $C'_n$ to one of the two second inputs of second differential amplifier $SDA_2$, and (iv) extending from each of the second mobile conductive surfaces $D'_n$ to another of the two second inputs of second differential amplifier $SDA_2$; and second synchronous detectors $SSD_1$ and $SSD_2$ coupled to the second output of second differential amplifiers $SDA_1$ and $SDA_2$ respectively;

wherein each of the stationary conductive surfaces a, b, c and d, the first mobile conductive surfaces $A_n$, $A'_n$, $B_n$ and $B'_n$, and the second mobile conductive surfaces $C_n$, $C'_n$, $D_n$ and $D'_n$ has (a) a substantially similar conductive surface area, $A_{cs}$, and (b) a substantially similar conductive surface shape.

16. A method of measuring a distance between two points using the symmetrical differential capacitive sensor of claim 14, said method comprising:

moving the first mobile sensor component from a first point along the array in the first direction x to a second point along the array; and converting first signal output from the first synchronous detector into a first calculated distance between the first point and the second point.

17. A method of using a symmetrical differential capacitive sensor, said method comprising:

moving a first mobile sensor component of a symmetrical differential capacitive sensor from a first point along an array in a first direction x to a second point corresponds to an x-coordinate of a position along an x-y plane of the array, the symmetrical differential capacitive sensor comprising:

the array, wherein the array comprises a grid of sets of stationary conductive surfaces a-d extending in the first direction x and a second direction y, with two or more sets of stationary conductive surfaces extending in the first direction x with each set being separated from one another by a first distance s, and two or more sets of stationary conductive surfaces a-d extending in the second direction y with each set being separated from one another by a third distance m, each set of stationary conductive surfaces comprising four conductive surfaces a, b, c and d (i) separated from one another in the first direction x by a second distance p and separated from one another in the second direction y by the third distance m, the second direction y being perpendicular to the first direction x, and (ii) electrically coupled to one another to form two equipotential bridged pairs of stationary conductive surfaces a-d and b-c per set;

a voltage source operatively adapted to provide modulating voltage to the array;

electrical connectors (i) extending from the two or more sets of equipotential bridged pairs of stationary conductive surfaces a-d to the voltage source, and (ii) extending from the two or more sets of equipotential bridged pairs of stationary conductive surfaces b-c to the voltage source;

the first mobile sensor component, wherein the first mobile sensor component comprises at least one set of first mobile sensing components, wherein each set of first mobile sensing components comprises at least one pair of side-by-side first mobile conductive surfaces $A_n$-$B_n$ (i) positioned a gap distance d from the array and (ii) movable relative to the array in the first direction x, wherein each first mobile conductive surface A and B of a given pair of conductive surfaces $A_n$-$B_n$ is separated from one another by the third distance m;

a first differential amplifier for each set of first mobile sensing components, wherein each first differential amplifier has two first inputs and a first output for measuring a potential difference between the two first inputs;

a pair of electrical connectors for each set of first mobile sensing components, each pair comprising (i) an electrical connector extending from first mobile conductive surface(s) A to one of the two first inputs of an associated first differential amplifier, and (ii) an electrical connector extending from first mobile conductive surface(s) B to another of the two first inputs of the associated first differential amplifier; and a first synchronous detector for each first differential amplifier, wherein each first synchronous detector is coupled to the first output of an associated first differential amplifier;

moving a second mobile sensor component from the first point along the array in the second direction y to a third point along the array, the third point corresponding to a y-coordinate of the position along the x-y plane, wherein the symmetrical differential capacitive sensor comprises:

the second mobile sensor component, wherein the second mobile sensor component comprises at least one set of second mobile sensing components, wherein each set of second mobile sensing components comprises at least one pair of side-by-side first mobile conductive surfaces $C_n$-$D_n$ (i) positioned the gap distance from the array and (ii) movable relative to the array in the second direction y, wherein each second mobile conductive surface C and D of a wen s air of conductive surfaces $C_n$-$D''$ is separated from one another by the second distance p;

a second differential amplifier for each set of second mobile sensing components, wherein each second differential amplifier has having two second inputs and a second output for measuring a potential difference between the two second inputs;

a pair of electrical connectors for each set of second mobile sensing components, each pair comprising (i) an electrical connector extending from second mobile conductive surface(s) C to one of the two second inputs of an associated second differential amplifier, and (ii) an electrical connector extending from second mobile conductive surface(s) D to another of the two second inputs of the associated second differential amplifier; and a second synchronous detector for each second differential amplifier, wherein each second synchronous detector is coupled to the second output of an associated second differential amplifier;

wherein each of the stationary conductive surfaces a, b, c and d, the first mobile conductive surfaces A and B, and the second mobile conductive surfaces C and D has (a) a substantially similar conductive surface area, $A_{cs}$, and (b) a substantially similar conductive surface shape;

converting a first signal output from the first synchronous detector into a first calculated distance between the first point and the second point converting a second signal output from the second synchronous detector into a second calculated distance between the first point and the third point; and using the first calculated distance and the second calculated distance to determine the distance between the first point and the position along the x-y plane.

18. The method of claim 17, wherein conductive surface length L ranges from about 10 μm to about 10 mm; conductive surface width W ranges from about 10 μm to about 10 mm; distances s, p and m each independently ranges from about 0.1 μm to about 100 μm; gap distance d ranges from about 0.1 μm to about 10 μm; and the first calculated distance between the first point and the second point ranges from about 0.5 nm to about 500 mm.

* * * * *